United States Patent
Bae et al.

(10) Patent No.: US 12,047,956 B2
(45) Date of Patent: Jul. 23, 2024

(54) METHOD, USER EQUIPMENT, PROCESSING DEVICE, STORAGE MEDIUM, AND COMPUTER PROGRAM FOR TRANSMITTING UPLINK CHANNEL, AND METHOD AND BASE STATION FOR RECEIVING UPLINK CHANNEL

(71) Applicant: LG Electronics Inc., Seoul (KR)

(72) Inventors: Duckhyun Bae, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/165,064

(22) Filed: Feb. 6, 2023

(65) Prior Publication Data
US 2023/0180245 A1    Jun. 8, 2023

Related U.S. Application Data

(63) Continuation of application No. PCT/KR2021/010394, filed on Aug. 6, 2021.
(Continued)

(30) Foreign Application Priority Data

Aug. 6, 2020 (KR) .......... 10-2020-0098860
Apr. 5, 2021 (KR) .......... 10-2021-0044321

(51) Int. Cl.
*H04W 72/21* (2023.01)
*H04B 7/06* (2006.01)
(Continued)

(52) U.S. Cl.
CPC .......... *H04W 72/21* (2023.01); *H04B 7/0626* (2013.01); *H04L 1/1812* (2013.01); *H04W 72/0446* (2013.01); *H04W 72/56* (2023.01)

(58) Field of Classification Search
CPC . H04W 72/21; H04W 72/0446; H04W 72/56; H04B 7/0626; H04L 1/1812
See application file for complete search history.

(56) References Cited

U.S. PATENT DOCUMENTS

2015/0036566 A1\* 2/2015 Blankenship ....... H04W 52/281
    370/311
2019/0261361 A1\* 8/2019 Xiong ................... H04W 72/02
(Continued)

OTHER PUBLICATIONS

CATT, "UL control enhancements for URLLC," 3GPP TSG RAN WG1 Meeting #98bis, R1-1910342, Chongqing, China, Oct. 14-20, 2019, 11 pages.
(Continued)

*Primary Examiner* — Chi H Pham
*Assistant Examiner* — Raul Rivas
(74) *Attorney, Agent, or Firm* — Fish & Richardson P.C.

(57) ABSTRACT

A UE may comprise: determining that uplink channels with different priorities overlap with respect to time; determining whether the uplink channels with the different priorities satisfy multiplexing timeline conditions; determining, on the basis of the non-satisfaction of the multiplexing timeline conditions by the uplink channels with different priorities, an uplink channel to be multiplexed, for uplink channels with the highest priority, that satisfy the multiplexing timeline conditions, from among the different priorities; and transmitting the uplink channel to be multiplexed.

18 Claims, 13 Drawing Sheets

Related U.S. Application Data

(60) Provisional application No. 63/069,711, filed on Aug. 24, 2020.

(51) Int. Cl.
*H04L 1/1812* (2023.01)
*H04W 72/0446* (2023.01)
*H04W 72/56* (2023.01)

(56) References Cited

U.S. PATENT DOCUMENTS

| | | | |
|---|---|---|---|
| 2019/0306922 A1* | 10/2019 | Xiong | H04W 72/21 |
| 2019/0373598 A1* | 12/2019 | Kundu | H04L 5/0057 |
| 2020/0205150 A1* | 6/2020 | Cheng | H04W 72/21 |

OTHER PUBLICATIONS

Office Action in Korean Appln. No. 10-2023-7003759, mailed on Sep. 15, 2023, 14 pages (with English translation).

* cited by examiner

METHOD, USER EQUIPMENT, PROCESSING DEVICE, STORAGE MEDIUM, AND COMPUTER PROGRAM FOR TRANSMITTING UPLINK CHANNEL, AND METHOD AND BASE STATION FOR RECEIVING UPLINK CHANNEL

CROSS-REFERENCE TO RELATED APPLICATIONS

This application is a continuation of International Application No. PCT/KR2021/010394, filed on Aug. 6, 2021, which claims the benefit of Korean Patent Application No. 10-2020-0098860, filed on Aug. 6, 2020, U.S. Provisional Application No. 63/069,711, filed on Aug. 24, 2020, and Korean Patent Application No. 10-2021-0044321, filed on Apr. 5, 2021. The disclosures of the prior applications are incorporated by reference in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

In an aspect of the present disclosure, there is provided a method of transmitting an uplink channel by a user equipment (UE) in a wireless communication system. The method may include: determining that uplink channels with different priorities overlap in time; determining whether the uplink channels with the different priorities satisfy a multiplexing timeline condition; based on that the uplink channels with the different priorities do not satisfy the multiplexing timeline condition, determining an uplink channel for multiplexing for uplink channels having a highest priority among the different priorities and satisfying the multiplexing timeline condition; and performing transmission of the uplink channel for multiplexing.

In another aspect of the present disclosure, there is provided a UE configured to transmit an uplink channel in a wireless communication system. The UE may include: at least one transceiver; at least one processor; and at least one computer memory operably connected to the at least one processor and configured to store instructions that, when executed, cause the at least one processor to perform operations. The operations may include: determining that uplink channels with different priorities overlap in time; determining whether the uplink channels with the different priorities satisfy a multiplexing timeline condition; based on that the uplink channels with the different priorities do not satisfy the multiplexing timeline condition, determining an uplink channel for multiplexing for uplink channels having a highest priority among the different priorities and satisfying the multiplexing timeline condition; and performing transmission of the uplink channel for multiplexing.

In another aspect of the present disclosure, there is provided a processing device in a wireless communication system. The processing device may include: at least one processor; and at least one computer memory operably connected to the at least one processor and configured to store instructions that, when executed, cause the at least one processor to perform operations. The operations may include: determining that uplink channels with different priorities overlap in time; determining whether the uplink channels with the different priorities satisfy a multiplexing timeline condition; based on that the uplink channels with the different priorities do not satisfy the multiplexing timeline condition, determining an uplink channel for multiplexing for uplink channels having a highest priority among the different priorities and satisfying the multiplexing timeline condition; and performing transmission of the uplink channel for multiplexing.

In another aspect of the present disclosure, there is provided a computer-readable storage medium. The computer-readable storage medium may be configured to store at least one computer program including instructions that, when executed by at least one processor, cause the at least one processor to perform operations for a UE. The operations may include: determining that uplink channels with different priorities overlap in time; determining whether the uplink channels with the different priorities satisfy a multiplexing timeline condition; based on that the uplink channels with the different priorities do not satisfy the multiplexing timeline condition, determining an uplink channel for multiplexing for uplink channels having a highest priority among the different priorities and satisfying the multiplexing timeline condition; and performing transmission of the uplink channel for multiplexing.

In another aspect of the present disclosure, there is provided a computer program stored in a computer program readable storage medium. The computer program may include at least one program code including instructions that, when executed, cause at least one processor to perform operations. The operations may include: determining that uplink channels with different priorities overlap in time; determining whether the uplink channels with the different priorities satisfy a multiplexing timeline condition; based on that the uplink channels with the different priorities do not satisfy the multiplexing timeline condition, determining an uplink channel for multiplexing for uplink channels having a highest priority among the different priorities and satisfying the multiplexing timeline condition; and performing transmission of the uplink channel for multiplexing.

In another aspect of the present disclosure, there is provided a method of receiving, by a base station (BS), an uplink channel from a UE in a wireless communication system. The method may include: determining that uplink channels with different priorities overlap in time; determining whether the uplink channels with the different priorities satisfy a multiplexing timeline condition; based on that the uplink channels with the different priorities do not satisfy the multiplexing timeline condition, determining an uplink channel for multiplexing for uplink channels having a highest priority among the different priorities and satisfying the multiplexing timeline condition; and performing reception of the uplink channel for multiplexing.

In a further aspect of the present disclosure, there is provided a BS configured to receive an uplink channel from a UE in a wireless communication system. The BS may include: at least one transceiver; at least one processor; and at least one computer memory operably connected to the at least one processor and configured to store instructions that, when executed, cause the at least one processor to perform operations. The operations may include: determining that uplink channels with different priorities overlap in time; determining whether the uplink channels with the different priorities satisfy a multiplexing timeline condition; based on that the uplink channels with the different priorities do not satisfy the multiplexing timeline condition, determining an uplink channel for multiplexing for uplink channels having a highest priority among the different priorities and satisfying the multiplexing timeline condition; and performing reception of the uplink channel for multiplexing.

In each aspect of the present disclosure, based on that the uplink channels with the different priorities do not satisfy the multiplexing timeline condition, transmission or reception of uplink channels other than the uplink channels having the highest priority satisfying the multiplexing timeline condition may be cancelled.

In each aspect of the present disclosure, based on that the uplink channels with the different priorities satisfy the multiplexing timeline condition, a non-overlapping uplink channel with a higher priority may be determined from among uplink channels with the higher priority, and a non-overlapping uplink channel with a lower priority may be determined from among uplink channels with the lower priority. Based on that the higher priority non-overlapping uplink channel and the lower priority non-overlapping uplink channel overlap in time, the lower priority non-overlapping uplink channel may be dropped, and transmission and reception of the higher priority non-overlapping uplink channel may be performed.

In each aspect of the present disclosure, determining whether the uplink channels with the different priorities satisfy the multiplexing timeline condition may include, based on that for each priority, uplink channels with a corresponding priority satisfy the multiplexing timeline condition, determining whether the multiplexing timeline condition is satisfied between the uplink channels with the different priorities.

In each aspect of the present disclosure, determining whether the uplink channels with the different priorities satisfy the multiplexing timeline condition may include: determining whether for each priority, uplink channels with a corresponding priority satisfy the multiplexing timeline condition; and dropping priority uplink channels that do not satisfy the multiplexing timeline condition and performing uplink transmission or reception based on priority uplink channels that satisfy the multiplexing timeline condition.

In each aspect of the present disclosure, determining whether the uplink channels with the different priorities satisfy the multiplexing timeline condition may include: determining whether the multiplexing timeline condition is satisfied between the uplink channels with the different priorities; and based on that the multiplexing timeline condition is not satisfied between the uplink channels with the different priorities, determining whether for each priority, uplink channels with a corresponding priority satisfy the multiplexing timeline condition.

The foregoing solutions are merely a part of the examples of the present disclosure and various examples into which the technical features of the present disclosure are incorporated may be derived and understood by persons skilled in the art from the following detailed description.

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure.

DETAILED DESCRIPTION

Figure 1:
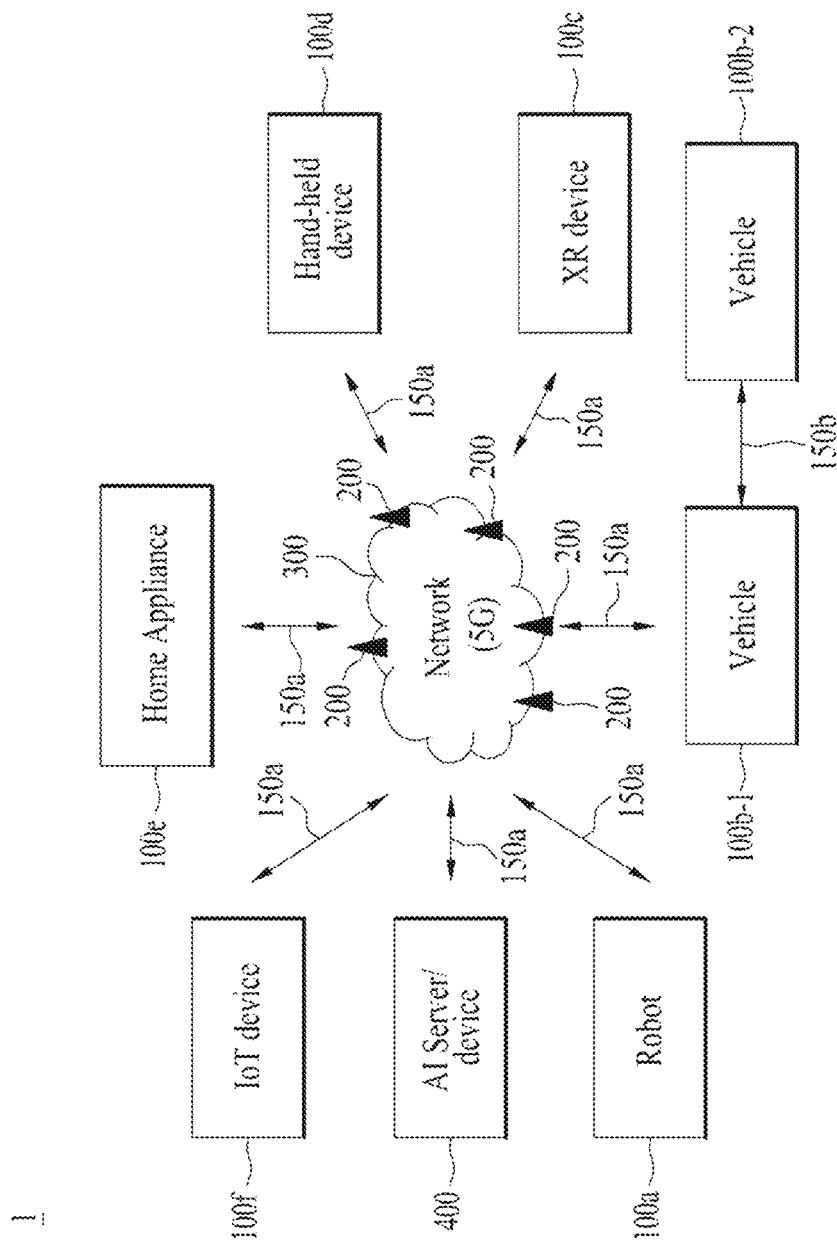
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. The PSCell is a primary Scell of the SCG. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., a set of resource elements (REs)) that carry downlink control information (DCI), and the PDSCH refers to a set of time-frequency resources (e.g., a set of REs) that carry DL data. The PUCCH, PUSCH, and PRACH refer to a set of time-frequency resources (i.e., a set of REs) that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In the present disclosure, a radio resource (e.g., a time-frequency resource) scheduled or configured for the UE by the BS for transmission or reception of PUCCH/PUSCH/PDSCH is also referred to as a PUCCH/PUSCH/PDSCH resource.

Since a communication device receives an SS/PBCH resource block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, not receiving physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to as a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
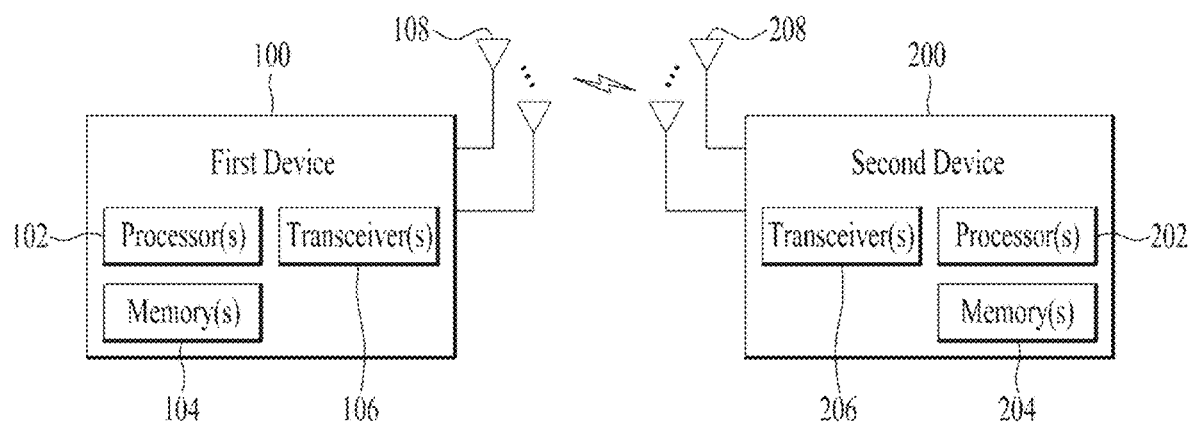
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the afore/below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the afore/below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of Things for low-power communication as well as LTE, NR, and 6G communications. For example, NB-IoT technology may be an example of Low Power Wide Area Network (LPWAN) technology, and may be implemented by, but is limited to, standards such as LTE Cat NB1 and/or LTE Cat NB2. Additionally or alternatively, the wireless communication technology implemented in the wireless devices XXX and YYY of the present disclosure may perform communication based on the LTE-M technology. For example, the LTE-M technology may be an example of the LPWAN technology, and may be called by various names such as enhanced machine type communication (eMTC). For example, the LTE-M technology may be implemented by, but is not limited to, at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M. Additionally or alternatively, the wireless communication technology implemented in the wireless devices XXX and YYY of the present disclosure may include, but is not limited to, at least one of ZigBee, Bluetooth, and Low Power Wide Area Network (LPWAN) considering low-power communication. For example, the ZigBee technology may create personal area networks (PAN) related to small/low-power digital communications based on various standards such as IEEE 802.15.4, and may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP)

layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
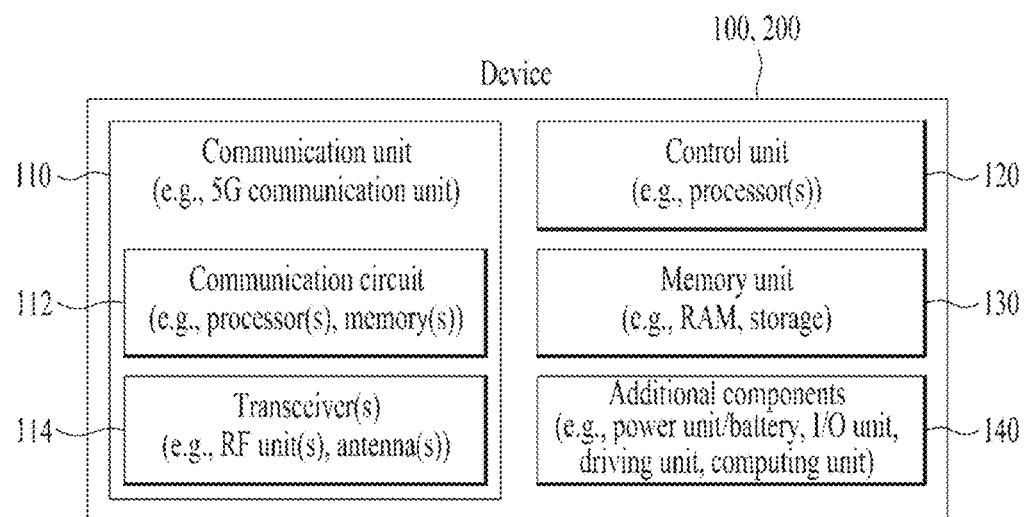
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include a program code stored on at least one computer-readable (non-volatile) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-volatile) storage medium A communication device of the present disclosure includes at least one processor; and at least one computer memory operably connectable to the at least one processor and configured to store instructions for causing, when executed, the at least one processor to perform operations according to example(s) of the present disclosure described later.

Figure 4:
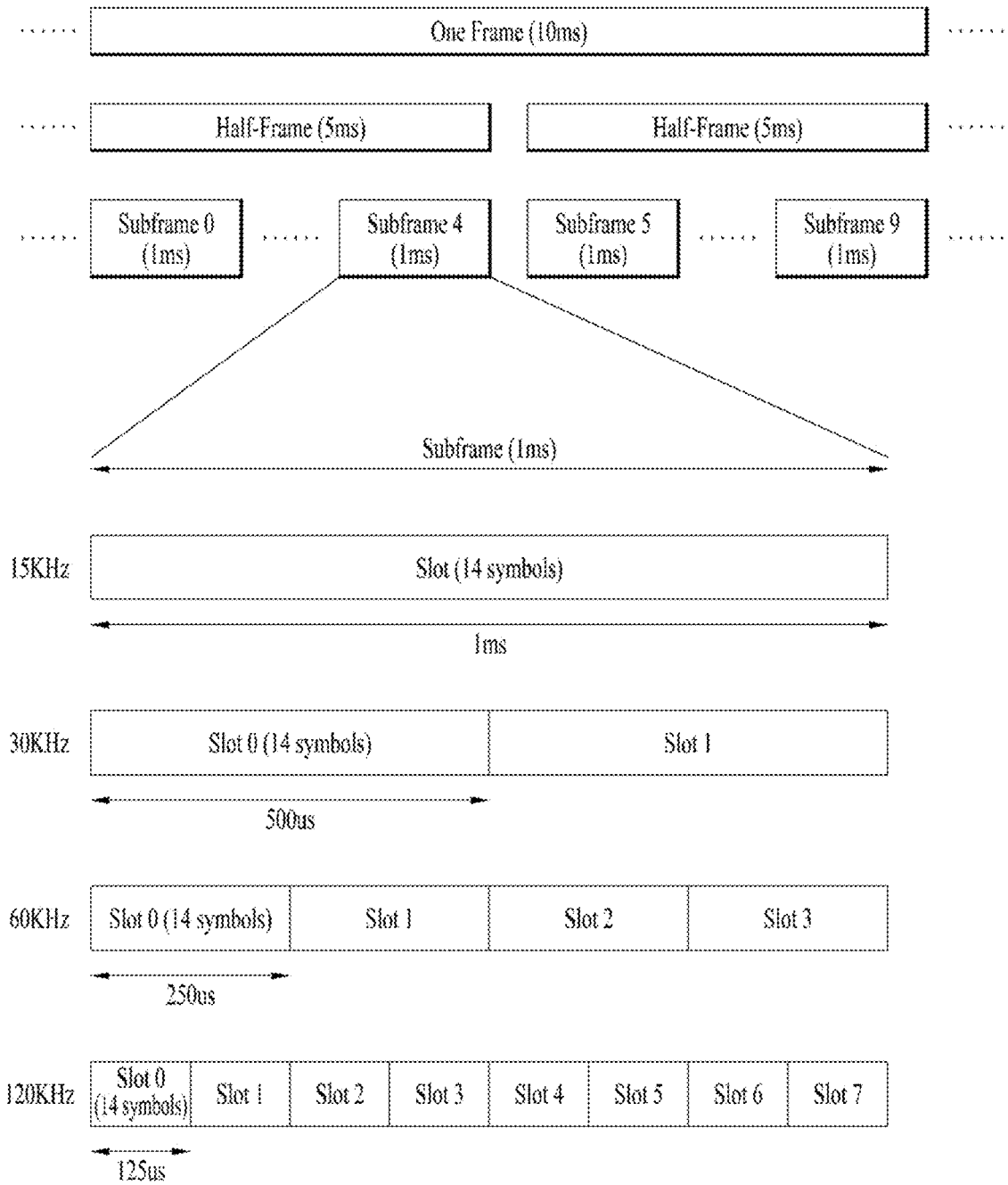
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f=(\Delta f_{max}*N_f/100)*T_c=10$ ms and is divided into two half-frames of 5 ms each. A basic time unit for NR is $T_c=1/(\Delta f_{max}*N_f)$ where $\Delta f_{mx}=480*10^3$ Hz and $N_f=4096$. For reference, a basic time unit for LTE is $T_s=1/(\Delta f_{ref}*N_{f,ref})$ where $\Delta f_{ref}=15*10^3$ Hz and $N_{f,ref}=2048$. $T_c$ and $T_f$ have the relationship of a constant $\kappa=T_s/T_f=64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f=2^u*15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f=2^u*15$ kHz.

TABLE 2

| u | $N^{slot}_{symb}$ | $N^{frame, u}_{slot}$ | $N^{subframe, u}_{slot}$ |
|---|---|---|---|
| 2 | 12 | 40 | 4 |

For a subcarrier spacing configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{frame,u}_{slot}-1\}$.

Figure 5:
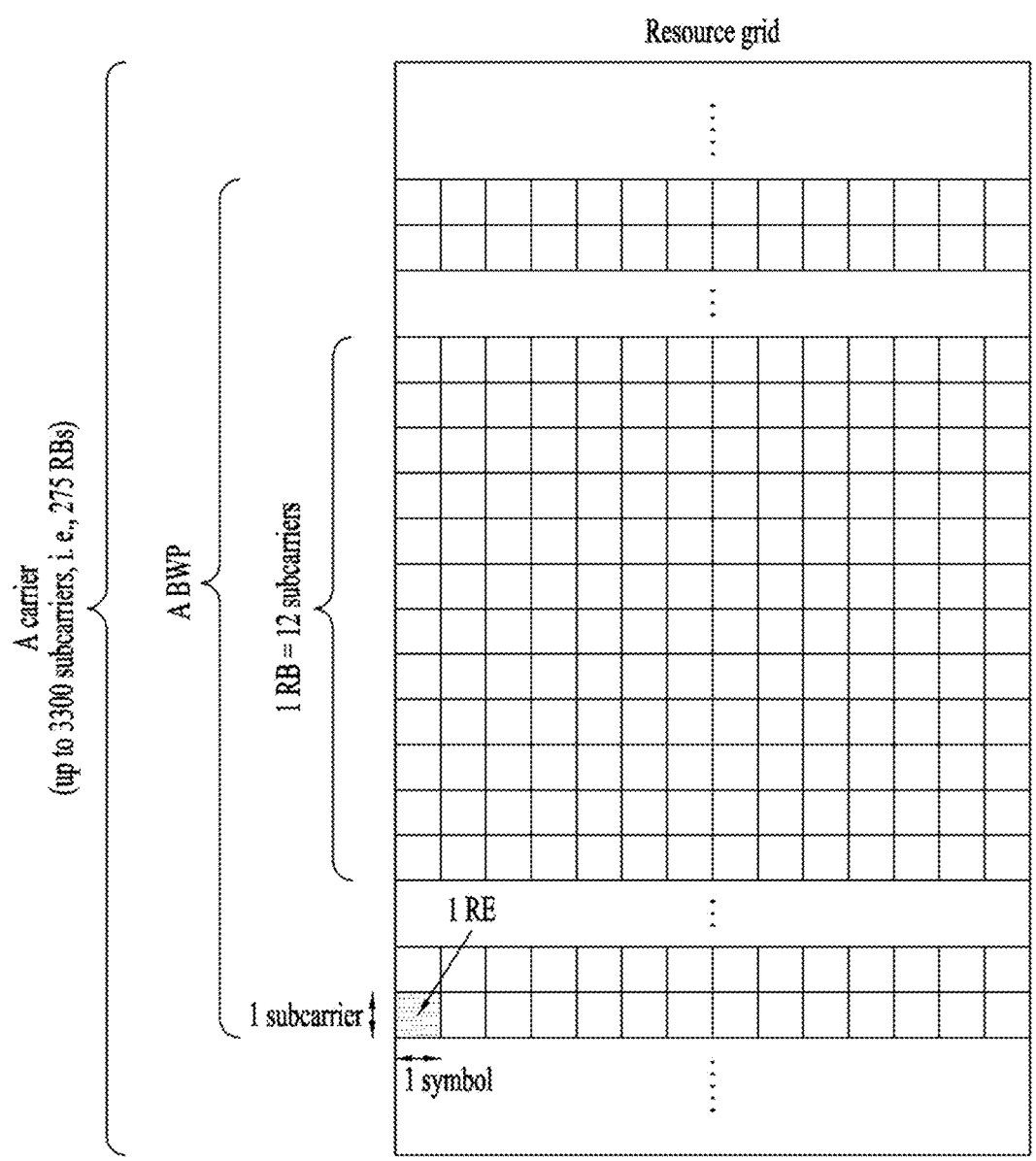
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB} = n^u_{CRB} + N^{size,u}_{BWP,i}$, where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided with the following parameters for the serving cell: i) an SCS; ii) a CP; iii) a CRB $N^{start}_{BWP} = O_{carrier} + RB_{start}$ and the number of contiguous RBs $N^{size}_{BWP} = L_{RB}$ provided by an RRC parameter locationAndBandwidth, which indicates an offset $RB_{set}$ and a length $L_{RB}$ as a resource indicator value (MV) on the assumption of $N^{start}_{BWP} = 275$, and a value $O_{carrier}$ provided by an RRC parameter offsetToCarrier for the SCS; an index in the set of DL BWPs or UL BWPs; a set of BWP-common parameters; and a set of BWP-dedicated parameters.

Virtual resource blocks (VRBs) may be defined within the BWP and indexed from 0 to $N^{size,u}_{BWP,i}-1$, where i denotes a BWP number. The VRBs may be mapped to PRBs according to non-interleaved mapping. In some implementations, VRB n may be mapped to PRB n for non-interleaved VRB-to-PRB mapping.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

NR frequency bands are defined as two types of frequency ranges, i.e., FR1 and FR2. FR2 is also referred to as millimeter wave (mmW). The following table shows frequency ranges within which NR may operate.

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including information about resource allocation of the DL-SCH is referred to as PDSCH scheduling DCI, and DCI including information about resource allocation of the UL-SCH is referred to as PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI). When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell.

When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. UCI types transmitted on the PUCCH may include hybrid automatic repeat request acknowledgement (HARQ-ACK) information, a scheduling request (SR), and channel state information (CSI). UCI bits may include HARQ-ACK information bits if any, SR information bits if any, link recovery request (LRR) information bits if any, and CSI bits if any. In the present disclosure, the HARQ-ACK information bits may correspond to a HARQ-ACK codebook.

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CRI), an SS/PBCH resource block indicator (SSBRI), and a layer indicator (LI). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

Link recovery request (LRR):

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 4.

(0) PUCCH format 0 (PF0 or F0)

Supported UCI payload size: up to K bits (e.g., K=2)

Number of OFDM symbols constituting a single PUCCH: 1 to X symbols (e.g., X=2)

Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.

Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH format 1 (PF1 or F1)

Supported UCI payload size: up to K bits (e.g., K=2)

Number of OFDM symbols constituting a single PUCCH: Y to Z symbols (e.g., Y=4 and Z=14)

Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH format 2 (PF2 or F2)

Supported UCI payload size: more than K bits (e.g., K=2)

Number of OFDM symbols constituting a single PUCCH: 1 to X symbols (e.g., X=2)

Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRBs, the number of symbols for PUCCH transmission, and/or the first symbol for PUCCH transmission.

(3) PUCCH format 3 (PF3 or F3)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH format 4 (PF4 or F4)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 4

| PUCCH format | Length in OFDM symbols $N^{PUCCH}_{symb}$ | Number of bits | Usage | Etc. |
| --- | --- | --- | --- | --- |
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2

PUCCH resource set #1, if 2<the number of UCI bits=<$N_1$

. . . .

PUCCH resource set #(K−1), if $N_{K-2}$<the number of UCI bits=<$N_{K-1}$

Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 4).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

Resource Allocation by PDCCH: Dynamic Grant/Assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. HARQ information on a DL-SCH or UL-SCH may include a new information indicator (NDI), transport block size (TBS), redundancy version (RV), and HARQ process ID (i.e., HARQ process number). The size and usage of the DCI carried by one PDCCH differs according to a DCI format. For example, DCI format 0_0, DCI format 0_1, or DCI format 0_2 may be used to schedule the PUSCH, and DCI format 10, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 00, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 6:
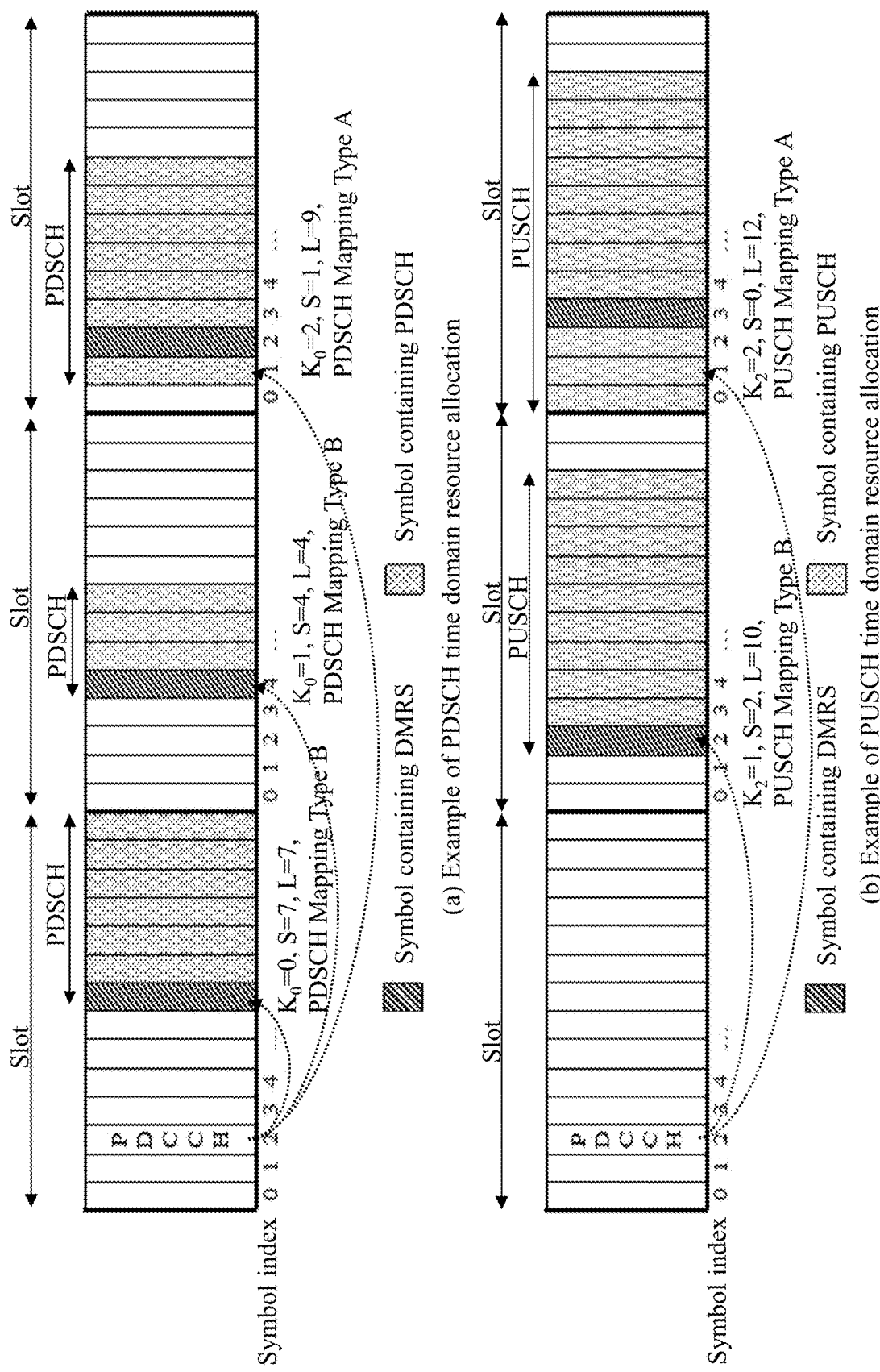
FIG. 6 illustrates an example of PDSCH time domain resource assignment (TDRA) caused by a PDCCH and an example of PUSCH TDRA caused by the PDCCH.

FIG. 6 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator value SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type has two mapping types: mapping type A and mapping type B. In PDSCH/PUSCH mapping type A, a demodulation reference signal (DMRS) is mapped to a PDSCH/PUSCH resource based on the start of a slot. According to other DMRS parameters, one or two symbols among the symbols of the PDSCH/PUSCH resource may be used as DMRS symbol(s). For example, in PDSCH/PUSCH mapping type A, the DMRS is located on the third symbol (symbol #2) or the fourth symbol (symbol #3) in the slot according to RRC signaling. In PDSCH/PUSCH mapping type B, the DMRS is mapped based on the first OFDM symbol of the PDSCH/PUSCH resource. According to other DMRS parameters, one or two symbols from the first symbol of the PDSCH/PUSCH resource may be used as DMRS symbol(s). For example, in PDSCH/PUSCH mapping type B, the DMRS is located on the first symbol allocated for PDSCH/PUSCH. In the present disclosure, the PDSCH/PUSCH mapping type may be referred to as a mapping type or a DMRS mapping type. For example, in the present disclosure, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:
    cs-RNTI corresponding to a CS-RNTI for retransmission;
      periodicity corresponding to a periodicity of configured
        grant Type 1;

timeDomainOffset indicating an offset of a resource with respect to system frame number (SFN)=0 in the time domain;

timeDomainAllocation value m that provides a row index m+1 pointing to the allocation table, indicating a combination of the start symbol S, the length L, and the PUSCH mapping type;

frequencyDomainAllocation that provides frequency domain resource allocation; and mcsAndTBS that provides IMCS indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame* numberOfSymbolsPerSlot)+symbol number in the slot]= (timeDomainOffset*numberOfSymbolsPerSlot+S+N* periodicity) modulo (1024*numberOfSlotsPerFrame*number OfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:
cs-RNTI corresponding to a CS-RNTI for activation, deactivation, and retransmission; and
periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying: [(SFN*numberOfSlotsPerFrame*numberOfSymbols PerSlot)+(slot number in the frame*numberOfSymbols PerSlot)+symbol number in the slot]=[(SFN$_{start\ time}$* numberOfSlotsPerFrame*numberOfSymbolsPerSlot+ slot$_{start\ time}$*numberOfSymbolsPerSlot+symbol$_{start\ time}$)+ N*periodicity] modulo (1024*numberOfSlotsPerFrame* numberOfSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset and/or a parameter harq-ProcID-Offset2 used to derive HARQ process IDs for configured UL grants may be further provided by the BS to the UE. harq-ProcID-Offset is an offset of a HARQ process for a configured grant for operation with shared spectrum channel access, and harq-ProcID-Offset2 is an offset of a HARQ process for a configured grant. In the present disclosure, cg-RetransmissionTimer is a duration after (re)transmission based on a configured grant in which the UE should not autonomously perform retransmission based on the HARQ process of the (re)transmission. cg-RetransmissionTimer may be provided to the UE by the BS when retransmission on a configured UL grant is configured. For configured grants configured with neither harq-ProcID-Offset nor cg-RetransmissionTimer, the HARQ process ID associated with the first symbol of UL transmission may be derived from the following equation: HARQ Process ID= [floor(CURRENT_symbol/periodicity)] modulo nrof-HARQ-Processes. For configured UL grants with harq-ProcID-Offset2, the HARQ process ID associated with the first symbol of UL transmission may be derived from the following equation: HARQ Process ID=[floor(CURRENT_symbol/periodicity)] modulo nrofHARQ-Processes+harq-ProcID-Offset2, where CURRENT_symbol=(SFN* numberOfSlotsPerFrame*numberOfSymbolsPerSlot+slot number in the frame*numberOfSymbolsPerSlot+symbol number in the slot), and numberOfSlotsPerFrame and numberOfSymbolsPerSlot denote the number of consecutive slots per frame and the number of consecutive OFDM symbols per slot, respectively. For configured UL grants with cg-RetransmissionTimer, the UE may select a HARQ process ID from among HARQ process IDs available for the configured grant configuration.

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling used to configure a semi-persistent transmission:
cs-RNTI corresponding to a CS-RNTI for activation, deactivation, and retransmission;
nrofHARQ-Processes that provides the number of HARQ processes for SPS;
periodicity that provides a periodicity of configured DL assignment for SPS;
n1PUCCH-AN that provides a HARQ resource for a PUCCH for SPS (the network configures the HARQ resource as format 0 or format 1, and the actual PUCCH resource is configured by PUCCH-Config and referred to in n1PUCCH-AN by the ID thereof).

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFN$_{start\ time}$+ slot$_{start\ time}$)+N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset used to derive HARQ process IDs for configured DL assignments may be further provided by the BS to the UE. harq-ProcID-Offset is an offset of a HARQ process for SPS. For configured DL assignments without harq-ProcID-Offset, a HARQ process ID associated with a slot in which DL transmission starts may be determined from the following equation: HARQ Process ID=[floor (CURRENT_slot*10/ (numberOfSlotsPerFrame*periodicity))] modulo nrof-HARQ-Processes, where CURRENT_slot=[(SFN* numberOfSlotsPerFrame)+slot number in the frame], and numberOfSlotsPerFrame denotes the number of consecutive slots per frame. For configured DL assignments with harq-ProcID-Offset, a HARQ process ID associated with a slot in which DL transmission starts may be determined from the following equation: HARQ Process ID=[floor (CURRENT_slot/periodicity)] modulo nrofHARQ-Processes+harq-ProcID-Offset, where CURRENT_slot=[(SFN*numberOfSlotsPerFrame)+slot number in the frame], and numberOfSlotsPerFrame denotes the number of consecutive slots per frame.

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 5 and Table 6. Table 5 shows an example of special fields for DL SPS and UL grant Type 2 scheduling activation PDCCH validation, and Table 6 shows an example of special fields for DL SPS and UL grant Type 2 scheduling release PDCCH validation.

TABLE 5

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 6

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

Figure 7:
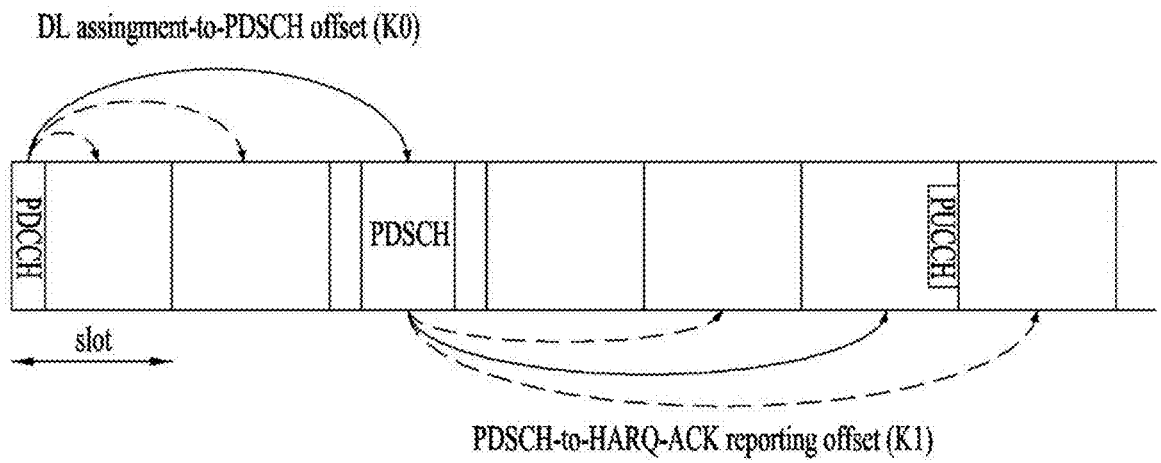
FIG. 7 illustrates a hybrid automatic repeat request-acknowledgement (HARQ-ACK) transmission/reception procedure.

FIG. 7 illustrates a HARQ-ACK transmission/reception procedure.

Referring to FIG. 7, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.

FDRA: FDRA indicates an RB set allocated to the PDSCH.
TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.
PDSCH-to-HARQ_feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as a semi-static HARQ-ACK codebook and a dynamic HARQ-ACK codebook according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, the HARQ-ACK information for the PDSCH may be transmitted in slot #(m+k). As an example, k∈{1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n-k). For example, when k∈{1, 2, 3, 4, 5, 6, 7, 8}, the HARQ-ACK information of slot #n may include HARQ-ACK corresponding to slot #(n−8) to slot #(n−1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. In the case of the dynamic HARQ-ACK codebook, the HARQ-ACK payload size that the UE is to report may be dynamically changed by the DCI etc. In the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

The semi-static HARQ-ACK codebook may be referred to as a Type-1 HARQ-ACK codebook, and the dynamic HARQ-ACK codebook may be referred to as a Type-2 HARQ-ACK codebook.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. A master information block (MIB) on a PBCH provides parameters (e.g., CORESET #0 configuration) for monitoring a PDCCH for scheduling a PDSCH carrying system information block 1 (SIB1) to the UE. The PBCH may also indicate that there is no associated SIB1. In this case, the UE may be provided with not only a frequency range in which the UE may assume that there is no SSB associated with SSB1 but also other frequencies to search for an SSB associated with SIB1. CORESET #0, which is a CORESET for scheduling SIB1 at least, may be configured by the MIB or dedicated RRC signaling.

A set of PDCCH candidates monitored by the UE is defined in terms of PDCCH search space sets. The search space set may be a common search space (CSS) set or a UE-specific search space (USS) set. Each CORESET configuration is associated with one or more search space sets, and each search space set is associated with one CORESET configuration. The search space set is determined based on the following parameters provided by the BS to the UE.

controlResourceSetId: an identifier for identifying a CORESET p associated with a search space set s.
monitoringSlotPeriodicityAndOffset: a PDCCH monitoring periodicity of slots $k_s$ and a PDCCH monitoring offset of $o_s$ slots to configure slots for PDCCH monitoring.
duration: a duration of $T_s < k_s$ slots indicating a number of slots in which the search space set s exists.
monitoringSymbolsWithinSlot: a PDCCH monitoring pattern within a slot, indicating first symbol(s) of the CORESET within a slot for PDCCH monitoring.
nrofCandidates: a number of PDCCH candidates per CCE aggregation level.
searchSpaceType: an indication that search space set s is either a CCE set or a USS set.

The parameter monitoringSymbolsWithinSlot may indicate the first symbol(s) for PDCCH monitoring in the slots configured for PDCCH monitoring (e.g., see monitoringSlotPeriodicityAndOffset and duration). For example, when monitoringSymbolsWithinSlot is a 14-bit parameter, the most significant (leftmost) bit may represent the first OFDM symbol in the slot, and the second most significant (leftmost) bit may represent the second OFDM symbol in the slot. In this way, the bits of monitoringSymbolsWithinSlot may represent the 14 OFDM symbols of the slot, respectively. For example, bit(s) set to 1 among the bits in monitoringSymbolsWithinSlot may identify the first symbol(s) of the CORESET in the slot.

A UE monitors PDCCH candidates in PDCCH monitoring occasions only. The UE determines a monitoring occasion on an active DL BWP from the PDCCH monitoring periodicity, the PDCCH monitoring offset, and the PDCCH monitoring pattern within a slot. In some implementations, for search space set s, the UE determines that a PDCCH monitoring occasion(s) existing in a slot with number $n^u_{s,f}$ in a frame with number $n_f$ if $(n_f * N^{frame,u}_{slot} + n^u_{s,f} - o_s)$ mod $k_s = 0$. The UE monitors PDCCH candidates for search space set s for $T_s$ consecutive slots, starting from slot $n^u_{s,f}$ and does not monitor PDCCH candidates for search space set s for the next $k_s - T_s$.

The following table shows search space sets, related RNTIs, and use cases thereof.

TABLE 7

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

The following table shows DCI formats carried by a PDCCH.

TABLE 8

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

TABLE 8-continued

| DCI format | Usage |
|---|---|
| 2_4 | Notifying a group of UEs of PRB(s) and OFDM symbol(s) where UE cancels the corresponding UL transmission from the UE |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. For a CSS, DCI format 0_0 and DCI format 1_0 have fixed sizes after the BWP size is initially given by RRC. For a USS, DCI format 0_0 and DCI format 1_0 are fixed in size in fields other than a frequency domain resource assignment (FDRA) field, and the FDRA field may vary in size by configuration of a related parameter by the BS. In DCI format 0_1 and DCI format 1_1, the size of the DCI field may be changed by various RRC reconfigurations by the BS. DCI format 20 may be used to provide dynamic slot format information (e.g., SFI DCI) to the UE, DCI format 2_1 may be used to provide DL pre-emption information to the UE, and DCI format 24 may be used to indicate a UL resource on which the UE needs to cancel UL transmission.

In a wireless communication system including the BS and the UE, when the UE transmits UCI on a PUCCH, a PUCCH resource may overlap with another PUCCH resource or a PUSCH resource on the time axis. For example, (1) a PUCCH (resource) and a PUCCH (resource) (for different UCI transmission) or (2) a PUCCH (resource) and a PUSCH (resource) may overlap on the time axis (in the same slot) in terms of the same UE. The UE may not support PUCCH-PUCCH simultaneous transmission or PUCCH-PUSCH simultaneous transmission (according to restrictions on UE capability or according to configuration information received from the BS). In addition, the UE may not be allowed to simultaneously transmit a plurality UL channels within a predetermined time range.

In the present disclosure, methods of handling a plurality of UL channels when the UL channels that the UE should transmit are present in a predetermined time range are described. In the present disclosure, methods of handling UCI and/or data that should have been transmitted/received on the UL channels are also described. The following terms are used in a description of examples in the present disclosure.

- UCI: UCI implies control information that the UE transmits on UL. The UCI includes multiple types of control information (i.e., UCI types). For example, the UCI may include HARQ-ACK (shortly, A/N or AN), SR, and/or CSI.
- UCI multiplexing: UCI multiplexing may mean an operation of transmitting different UCIs (UCI types) on a common physical UL channel (e.g., a PUCCH or PUSCH). UCI multiplexing may include multiplexing of different UCIs (UCI types). For convenience, the multiplexed UCI is referred to as MUX UCI. Further, UCI multiplexing may include an operation performed in relation to MUX UCI. For example, UCI multiplexing may include a process of determining a UL channel resource to transmit MUX UCI.
- UCI/data multiplexing: UCI/data multiplexing may mean an operation of transmitting UCI and data on a common physical UL channel (e.g., PUSCH). UCI/data multiplexing may include an operation of multiplexing UCI with data. For convenience, the multiplexed UCI/data is referred to as MUX UCI/data. Further, UCI/data multiplexing may include an operation performed in relation to MUX UCI/data. For example, UCI/data multiplexing may include a process of determining a UL channel resource to transmit MUX UCI/data.
- Slot: Slot means a basic time unit or time interval for data scheduling. A slot includes a plurality of symbols. Here, a symbol may be an OFDM-based symbol (e.g., a CP-OFDM symbol or DFT-s-OFDM symbol).
- Overlapping UL channel resource(s): Overlapping UL channel resource(s) mean UL channel (e.g., PUCCH or PUSCH) resource(s) overlapping (at least partially) with each other on the time axis within a predetermined time period (e.g., slot). Overlapping UL channel resource(s) may imply UL channel resource(s) before UCI multiplexing is performed. In the present disclosure, (at least partially) overlapping UL channels on the time axis are referred to as colliding UL channels in time or in the time domain.

Figure 8:
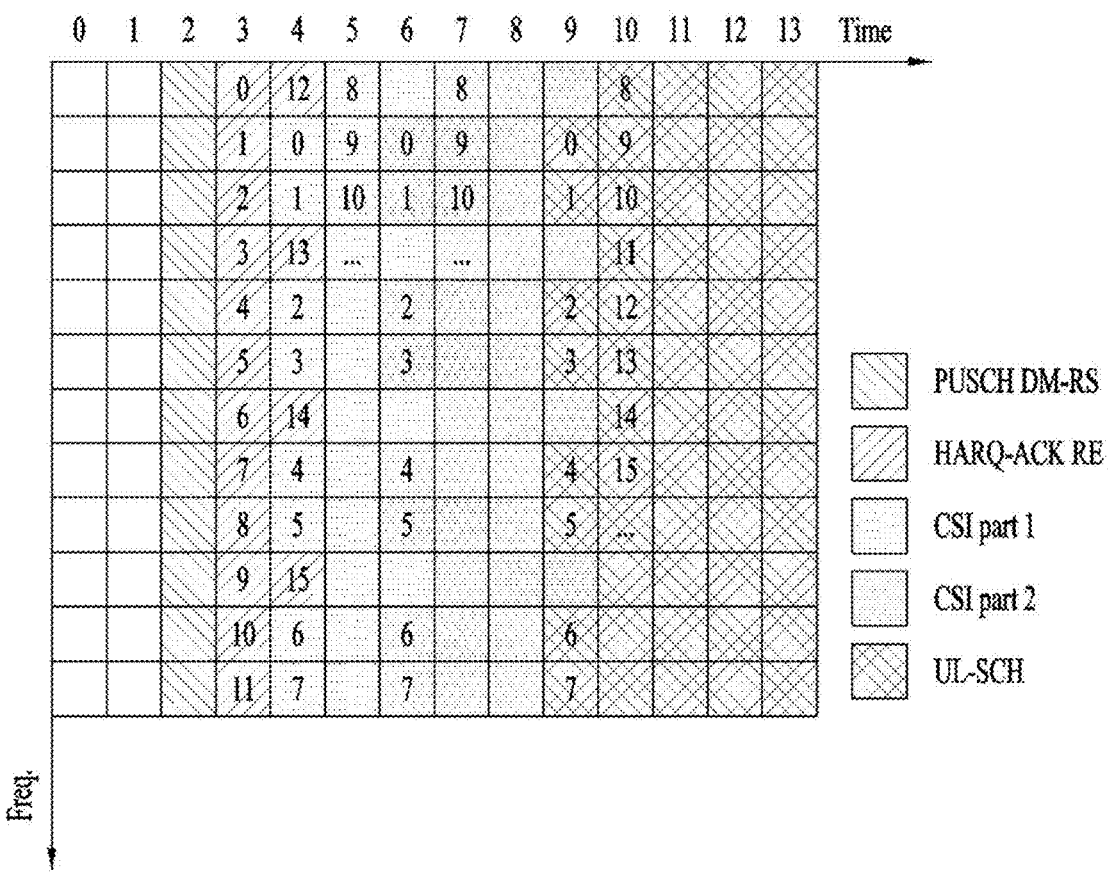
FIG. 8 illustrates an example of multiplexing uplink control information (UCI) with a PUSCH.

FIG. 8 illustrates an example of multiplexing UCI with a PUSCH. When PUCCH resource(s) and a PUSCH resource overlap in a slot and PUCCH-PUSCH simultaneous transmission is not configured, UCI may be transmitted on the PUSCH as illustrated. Transmission of the UCI on the PUSCH is referred to as UCI piggyback or PUSCH piggyback. Particularly, FIG. 8 illustrates the case in which HARQ-ACK and CSI are carried on the PUSCH resource.

When a plurality of UL channels overlaps within a predetermined time interval, a method for the UE to process the UL channels needs to be specified in order to allow the BS to correctly receive the UL channel(s). Hereinafter, methods of handling collision between UL channels will be described.

Figure 9:
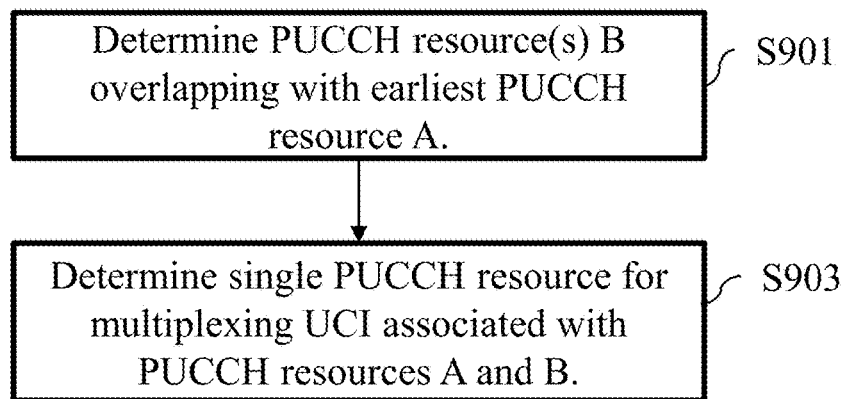
FIG. 9 illustrates an example of a process for a UE with overlapping PUCCHs in a single slot to handle collision between UL channels.

FIG. 9 illustrates an example of a process for a UE with overlapping PUCCHs in a single slot to handle collision between UL channels.

To transmit UCI, the UE may determine PUCCH resources for each UCI. Each PUCCH resource may be defined by a start symbol and a transmission interval. When PUCCH resources for PUCCH transmission overlap in a single slot, the UE may perform UCI multiplexing based on a PUCCH resource with the earliest start symbol. For example, the UE may determine overlapping PUCCH resource(s) (in time) (hereinafter, PUCCH resource(s) B) based on a PUCCH resource with the earliest start symbol (hereinafter, PUCCH resource A) in a slot (S901). The UE may apply a UCI multiplexing rule to the PUCCH resource A and the PUCCH resource(s) B. For example, based on UCI A of the PUCCH resource A and UCI B of the PUCCH resource(s) B, MUX UCI including all or part of the UCI A and the UCI B may be obtained according to the UCI multiplexing rule. To multiplex UCI associated with the PUCCH resource A and the PUCCH resource(s) B, the UE may determine a single PUCCH resource (hereinafter, MUX PUCCH resource) (S903). For example, the UE determines a PUCCH resource set corresponding to a payload size of the MUX UCI (hereinafter, PUCCH resource set X) among PUCCH resource sets configured or available for the UE and determines one of PUCCH resources belonging to the PUCCH resource set X as a MUX PUCCH resource. For example, the UE may determine one of the PUCCH resources belonging to the PUCCH resource set X as the MUX PUCCH resource, using a PUCCH resource indicator field in the last DCI among DCIs having a PDSCH-to- HARQ feedback timing indicator field that indicates the same slot for PUCCH transmission. The UE may determine the total number of PRBs of the MUX PUCCH resource based on the payload size of the MUX UCI and a maximum code rate for a PUCCH format of the MUX PUCCH resource. If the MUX PUCCH resource overlaps with other PUCCH resources (except for the PUCCH resource A and the PUCCH resource(s) B), the UE may perform the above-described operation again based on the MUX PUCCH resource (or a PUCCH resource having the earliest start symbol among the other PUCCH resources including the MUX PUCCH resource).

Figure 10:
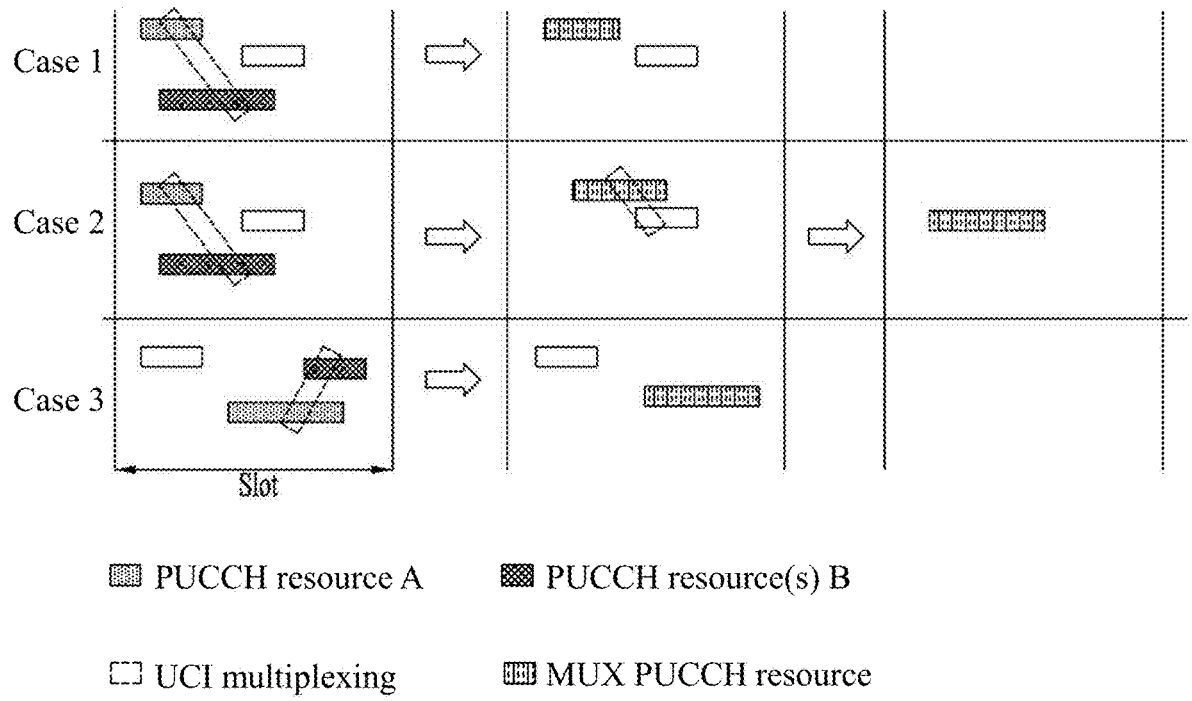
FIG. 10 illustrates cases for performing UCI multiplexing based on FIG. 9.

FIG. 10 illustrates cases for performing UCI multiplexing based on FIG. 9. Referring to FIG. 10, when a plurality of PUCCH resources overlap in a slot, UCI multiplexing may be performed based on the earliest PUCCH resource A (e.g., PUCCH resource A with the earliest start symbol). In FIG. 10, Case 1 and Case 2 show that the first PUCCH resource overlaps with another PUCCH resource. In this case, the process of FIG. 9 may be performed in a state in which the first PUCCH resource is regarded as the earliest PUCCH resource A. In contrast, Case 3 shows that the first PUCCH resource does not overlap with another PUCCH resource and the second PUCCH resource overlaps with another PUCCH resource. In Case 3, UCI multiplexing is not performed on the first PUCCH resource. Instead, the process of FIG. 9 may be performed in a state in which the second PUCCH resource is regarded as the earliest PUCCH resource A. Case 2 shows that a MUX PUCCH resource determined to transmit the multiplexed UCI newly overlaps with another PUCCH resource. In this case, the process of FIG. 9 may be additionally performed in a state in which the MUX PUCCH resource (or the earliest PUCCH resource (e.g., a PUCCH resource having the earliest start symbol) among the other PUCCH resources including the MUX PUCCH resource) is regarded as the earliest PUCCH resource A.

Figure 11:
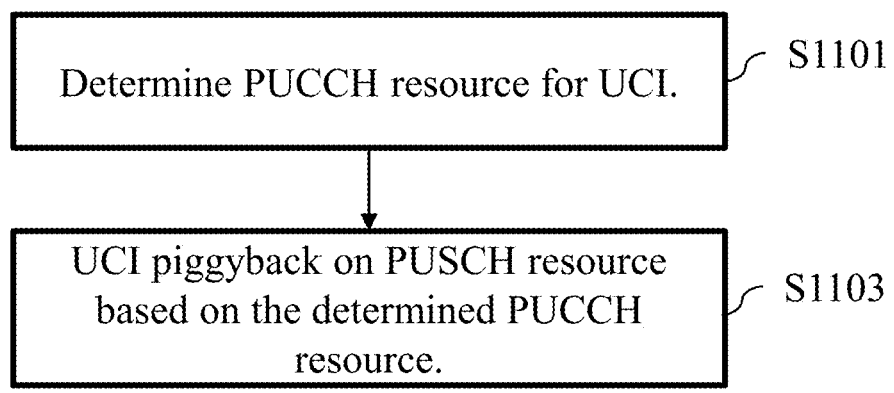
FIG. 11 illustrates a process for a UE with an overlapping PUCCH and PUSCH in a single slot to handle collision between UL channels.

FIG. 11 illustrates a process for a UE with an overlapping PUCCH and PUSCH in a single slot to handle collision between UL channels.

To transmit UCI, the UE may determine a PUCCH resource (S1101). Determination of the PUCCH resource for the UCI may include determining a MUX PUCCH resource. In other words, determination of the PUCCH resource for the UCI by the UE may include determining the MUX PUCCH resource based on a plurality of overlapping PUCCHs in a slot.

The UE may perform UCI piggyback on a PUSCH resource based on the determined (MUX) PUCCH resource (S1103). For example, when there is a PUSCH resource (on which multiplexed UCI transmission is allowed), the UE may apply the UCI multiplexing rule to PUCCH resource(s) overlapping with the PUSCH resource (on the time axis). The UE may transmit the UCI on the PUSCH.

When there is no PUSCH overlapping with the determined PUCCH resource in a slot, S1103 is omitted and the UCI may be transmitted on the PUCCH.

When the determined PUCCH resource overlaps with a plurality of PUSCHs on the time axis, the UE may multiplex the UCI with one of the PUSCHs. For example, when the UE intends to transmit the PUSCHs to respective serving cells, the UE may multiplex the UCI on a PUSCH of a specific serving cell (e.g., a serving cell having the smallest serving cell index) among the serving cells. When more than one PUSCH is present in the slot of the specific serving cell, the UE may multiplex the UCI on the earliest PUSCH transmitted in the slot.

Figure 12:
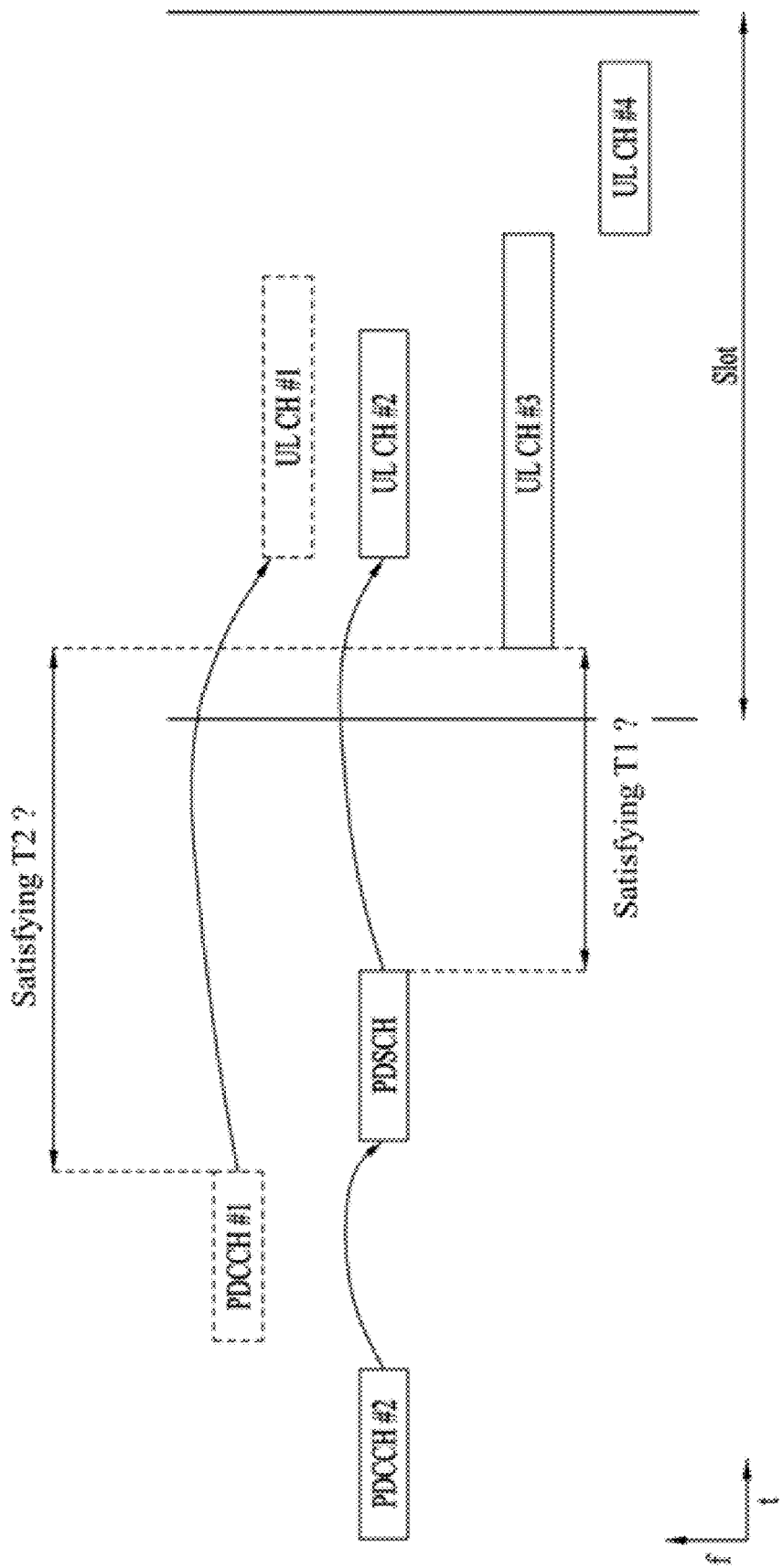
FIG. 12 illustrates UCI multiplexing considering a timeline condition.

FIG. 12 illustrates UCI multiplexing considering a timeline condition. When the UE performs UCI and/or data multiplexing for overlapping PUCCH(s) and/or PUSCH(s) on the time axis, the UE may be lacking in processing time for UCI and/or data multiplexing due to flexible UL timing configuration for the PUCCH or the PUSCH. In order to prevent the processing time of the UE from being insufficient, two timeline conditions (hereinafter, multiplexing timeline conditions) described below are considered in a process of performing UCI/data multiplexing for the overlapping PUCCH(s) and/or PUSCH(s) (on the time axis).

(1) The last symbol of a PDSCH corresponding to HARQ-ACK information is received before time T1 from the start symbol of the earliest channel among the overlapping PUCCH(s) and/or PUSCH(s) (on the time axis). T1 may be determined based on i) a minimum PDSCH processing time N1 defined according to a UE processing capability, and/or ii) $d_{1,1}$ predefined as an integer equal to or greater than 0 according to a position of scheduled symbol(s), PDSCH mapping type, BWP switching, etc.

For example, T1 may be determined as follows: $T1=(N1+d_{1,1})*(2048+144)*\kappa*2^{-u}*T_c$. N1 is based on u of Table 9 and Table 10 for UE processing capabilities #1 and #2, respectively, and μ is one of ($\mu_{PDCCH}$, $\mu_{PDSCH}$, $\mu_{UL}$), that causes the largest T1, where $\mu_{PDCCH}$ corresponds to a subcarrier spacing of a PDCCH for scheduling the PDSCH, $\mu_{PDSCH}$ corresponds to a subcarrier spacing of the scheduled PDSCH, $\mu_{UL}$ corresponds to a subcarrier spacing of a UL channel on which HARQ-ACK is to be transmitted, and $\kappa=T_s/T_f=64$. In Table 9, in the case of $N_{1,0}$, if a PDSCH DMRS position of an added DMRS is $l_1=12$, then $N_{1,0}=14$ and, otherwise, $N_{1,0}=13$ (refer to Section 7.4.1.1.2 of 3GPP TS 38.211). If the last symbol of the PDSCH for PDSCH mapping type A is present on an i-th slot, $d_{1,1}=7-i$ for i<7 and, otherwise, $d_{1,1}=0$. If the PDSCH has mapping type B for UE processing capability #1, $d_{1,1}$ may be 0 when the number of allocated PDSCH symbols is 7, $d_{1,1}$ may be 3 when the number of allocated PDSCH symbols is 4, $d_{1,1}$ may be 3+d when the number of allocated PDSCH symbols is 2, where d is the number of overlapping symbols of the scheduling PDCCH and the scheduled PDSCH. If the PDSCH mapping type is B for UE processing capability #2, $d_{1,1}$ may be 0 when the number of allocated PDSCH symbols is 7, and $d_{1,1}$ may correspond to the number of overlapping symbols of the scheduling PDCCH and the scheduled PDSCH when the number of allocated PDSCH symbols is 4. Further, if the number of allocated PDSCH symbols is 2, $d_{1,1}$ may be 3 when the scheduling PDSCH is within a 3-symbol CORESET and the CORESET and the PDSCH have the same starting symbol, and $d_{1,1}$ may be the number of overlapping symbols of the scheduling PDCCH and the scheduled PDSCH for the other cases. In the present disclosure T1 may also be referred to as T_proc,1.

(2) The last symbol of a (e.g., triggering) PDCCH for indicating PUCCH or PUSCH transmission is received before time T2 from the start symbol of the earliest channel among overlapping PUCCH(s) and/or PUSCH(s) (on the time axis). T2 may be determined based on i) a minimum PUSCH preparation time N1 defined according to a UE PUSCH timing capability, and/or ii) $d_{2,x}$ predefined as an integer equal to or greater than 0 according to the scheduled symbol position, BWP switching, etc. $d_{2,x}$ may be categorized into $d_{2,1}$ related to the position of scheduled symbol(s) and $d_{2,2}$ related to BWP switching.

For example, T2 may be determined as follows: $T2=\max\{(N2+d_{2,1})*(2048+144)*\kappa*2^{-u}*T_c+T_{ext}+T_{switch}, d_{2,2}\}$. N2 is based on u of Table 11 and Table 12 for UE timing capabilities #1 and #2, respectively, and p is one of ($\mu_{DL}$, $\mu_{UL}$), that causes the largest T1, where $\mu_{DL}$ corresponds to a subcarrier spacing of a PDCCH carrying DCI for scheduling a PUSCH, $\mu_{UL}$ corresponds to a subcarrier spacing of the PUSCH, and $\kappa=T_c/T_f=64$. If the first symbol of PUSCH allocation is composed only of a DMRS, then $d_{2,1}$ may be 0 and, otherwise, $d_{2,1}$ may be 1. If the scheduling DCI has triggered BWP switching, $d_{2,2}$ is equal to a switching time and, otherwise, $d_{2,2}$ is 0. The switching time may be differently defined depending on a frequency range (FR). For example, the switching time may be defined as 0.5 ms for FR1 and as 0.25 ms for FR2. In the present disclosure, T2 may also be referred to as T_proc,2.

Tables below show processing times according to UE processing capability. Particularly, Table 9 shows a PDSCH processing time for PDSCH processing capability #1 of the UE, Table 10 shows a PDSCH processing time for PDSCH processing capability #2 of the UE, Table 11 shows a PUSCH preparation time for PUSCH timing capability #1 of the UE, and Table 12 shows a PUSCH processing time for PUSCH timing capability #2 of the UE.

TABLE 9

| u/SCS | PDSCH decoding time N1 [symbols] | |
|---|---|---|
| | Front-loaded DMRS only | Front-loaded + additional DMRS |
| 0/15 kHz | 8 | $N_{1,0}$ |
| 1/30 kHz | 10 | 13 |
| 2/60 kHz | 17 | 20 |
| 3/120 kHz | 20 | 24 |

TABLE 10

| u/SCS | PDSCH decoding time N1 [symbols] |
|---|---|
| 0/15 kHz | 3 |
| 1/30 kHz | 4.5 |
| 2/60 kHz | 9 for frequency range 1 |

TABLE 11

| u/SCS | PUSCH preparation time N2 [symbols] |
|---|---|
| 0/15 kHz | 10 |
| 1/30 kHz | 12 |
| 2/60 kHz | 23 |
| 3/120 kHz | 36 |

TABLE 12

| u/SCS | PUSCH preparation time N2 [symbols] |
|---|---|
| 0/15 kHz | 5 |
| 1/30 kHz | 5.5 |
| 2/60 kHz | 11 for frequency range 1 |

The UE may report a PDSCH processing capability supported thereby with respect to carriers corresponding to one band entry within a band combination to the BS. For example, the UE may report a UE capability regarding whether the UE supports PDSCH processing capability #1 only or supports PDSCH processing capability #2, with respect to each SCS supported in a corresponding band. The UE may report a PUSCH processing capability supported thereby with respect to carriers corresponding to one band entry within a band combination. For example, the UE may report a UE capability regarding whether the UE supports PUSCH processing capability #1 only or supports PUSCH processing capability #2, with respect to each SCS supported in a corresponding band.

If the UE configured to multiplex different UCI types within one PUCCH intends to transmit a plurality of overlapping PUCCHs in a slot or transmit overlapping PUCCH (s) and PUSCH(s) in a slot, the UE may multiplex the UCI types when specific conditions are fulfilled. The specific conditions may include multiplexing timeline condition(s). For example, PUCCH(s) and PUSCH(s) to which UCI multiplexing is applied in FIGS. 9 to 11 may be UL channels that satisfy the multiplexing timeline condition(s). Referring to FIG. 12, the UE may need to transmit a plurality of UL channels (e.g., UL channels #1 to #4) in the same slot. Here, UL CH #1 may be a PUSCH scheduled by PDCCH #1. UL CH #2 may be a PUCCH for transmitting HARQ-ACK for a PDSCH. The PDSCH is scheduled by PDCCH #2 and a resource of UL CH #2 may also be indicated by PDCCH #2.

In this case, if overlapping UL channels (e.g., UL channels #1 to #3) on the time axis satisfy the multiplexing timeline condition, the UE may perform UCI multiplexing for overlapping UL channels #1 to #3 on the time axis. For example, the UE may check whether the first symbol of UL CH #3 from the last symbol of the PDSCH satisfies the condition of T1. The UE may also check whether the first symbol of UL CH #3 from the last symbol of PDCCH #1 satisfies the condition of T2. If the multiplexing timeline condition is satisfied, the UE may perform UCI multiplex for UL channels #1 to #3. In contrast, if the earliest UL channel (e.g., UL channel having the earliest start symbol) among overlapping UL channels does not satisfy the multiplexing timeline condition, the UE may not be allowed to multiplex all of the corresponding UCI types.

Figure 13:
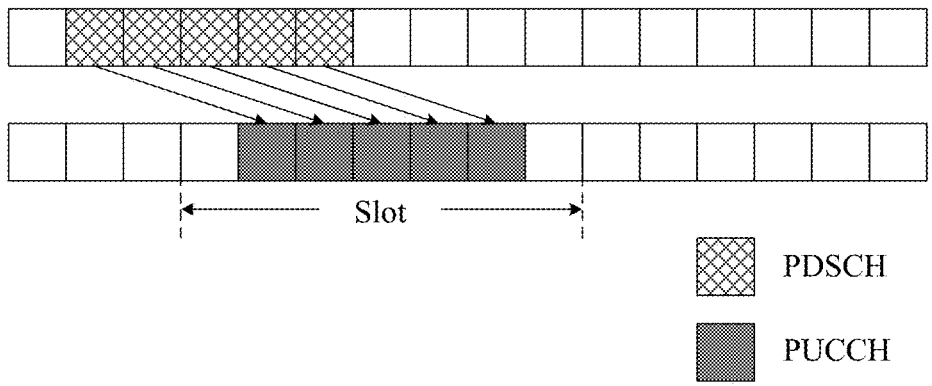
FIG. 13 illustrates transmission of a plurality of HARQ-ACK PUCCHs in a slot.

FIG. 13 illustrates transmission of a plurality of HARQ-ACK PUCCHs in a slot.

In some scenarios, it is regulated that a UE is not expected to transmit more than one PUCCH with HARQ-ACK information in a slot. Thus, according to these scenarios, the UE may transmit at most one PUCCH with HARQ-ACK information in one slot. In order to prevent a situation in which the UE fails to transmit the HARQ-ACK information due to restrictions on the number of HARQ-ACK PUCCHs transmittable by the UE, the BS needs to perform DL scheduling so that the HARQ-ACK information may be multiplexed on one PUCCH resource. However, when taking into consideration a service with stringent latency and reliability requirements, such as a URLLC service, a scheme of concentrating a plurality of HARQ-ACK feedbacks only on one PUCCH in a slot may not be desirable in terms of PUCCH performance. Furthermore, in order to support a latency-critical service, the BS may be required to schedule a plurality of consecutive PDSCHs with a short duration in one slot. Although the UE may transmit a PUCCH in random symbol(s) in a slot by the configuration/indication of the BS, if the UE is allowed to transmit only a maximum of one HARQ-ACK PUCCH in a slot, it may be impossible for the BS to perform fast back-to-back scheduling for PDSCHs and for the UE to perform fast HARQ-ACK feedback. Accordingly, in order to flexibly and efficiently use resources and support services, it is better to allow transmission of a plurality of (non-overlapping) HARQ-ACK PUCCHs (or PUSCHs) in one slot as illustrated in FIG. 13.

UL channels may be scheduled or triggered to have different priorities. In some implementations of the present disclosure, the priority of a UL channel may be represented by a priority index, and a UL channel with a larger priority index may be determined to have a higher priority than a UL channel with a smaller priority index. The priority of a UL channel may be provided by DCI that schedules or triggers transmission of the UL channel or an RRC configuration related to a configured grant for the UL channel. If the priority (or priority index) of a UL channel is not provided to the UE, it may be regulated that the priority of the UL channel is a low priority (or priority index 0).

Figure 14:
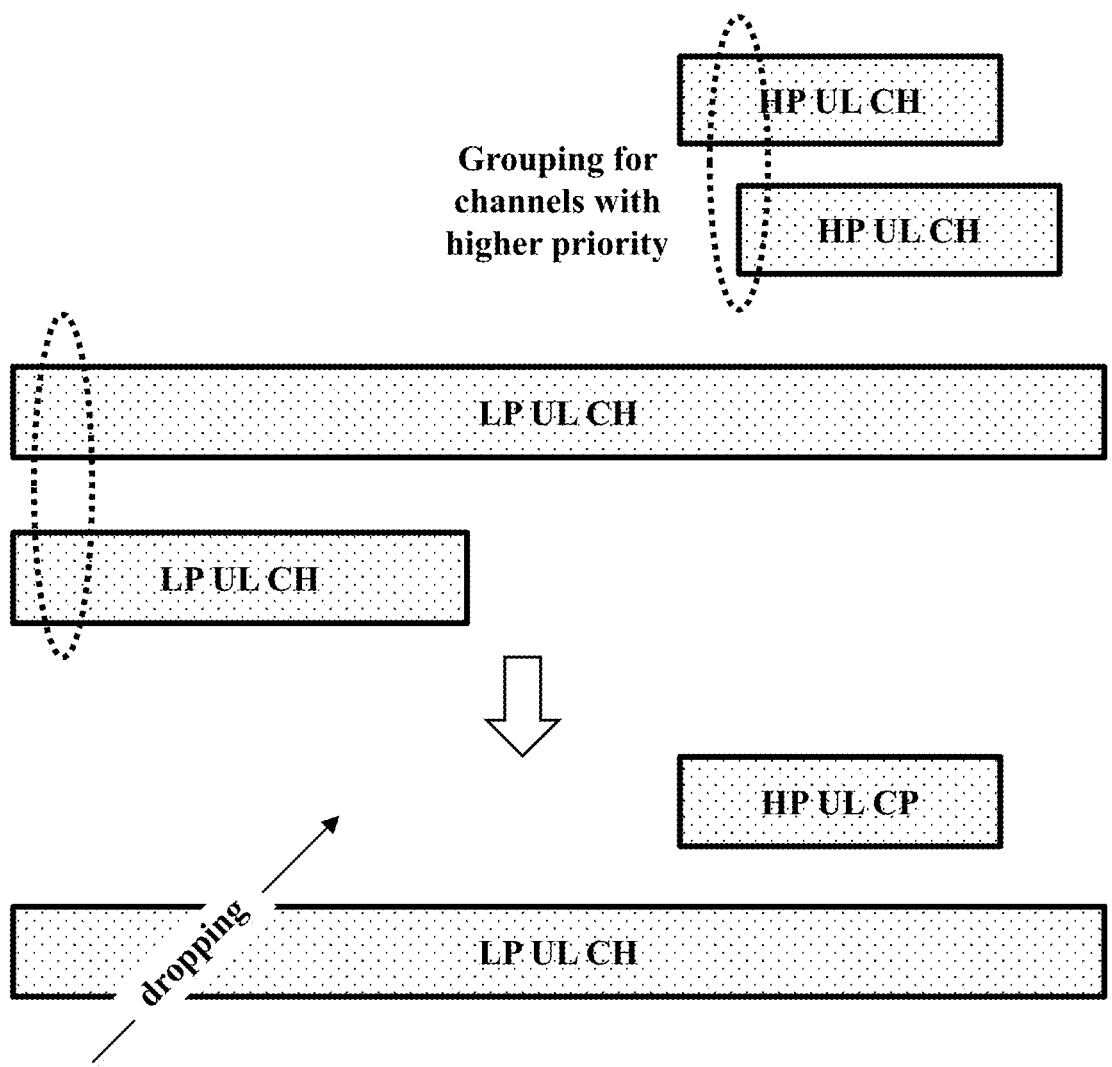
FIG. 14 illustrates a method of handling a collision between UL channels.

FIG. 14 illustrates a method of handling a collision between UL channels.

Referring to FIG. 14, when a plurality of PUCCH/PUSCH channels (resources) with different priorities have overlapping transmission periods in the time domain, the UE may group UL channels with the same priority and resolve overlaps between UL channels in the same group. Then, the UE may handle collisions between UL channel groups with different priorities. Here, handling or resolving a collision may include the following schemes: multiplexing between a plurality of channels and dropping thereof. For example, collision handling in a UL channel group including UL channels with the same priority may follow the rule(s) illustrated in FIGS. 7 to 12, and collision handling between UL channel groups with different priorities may include dropping a lower priority (LP) PUCCH and/or PUSCH and transmitting only a higher priority (HP) PUCCH and/or PUSCH. According to this method, even when channels with a lower priority do not directly overlap with channels with a high priority, if there is an overlap between a channel (resource) obtained by collision handling for one group and a channel (resource) obtained by collision handling for another group, transmission of UCI and/or UL data with the lower priority may be all dropped/cancelled depending on the result of collision handling for channels with the same priority.

In some scenarios, when the UE performs multiplexing on UL channels overlapping in time, the UE may multiplex only UCIs with the same priority on a PUCCH or PUSCH. In this case, it is assumed that the PUCCH or PUSCH has the same priority as the UCIs multiplexed by the UE on the PUCCH or the PUSCH.

Figure 15:
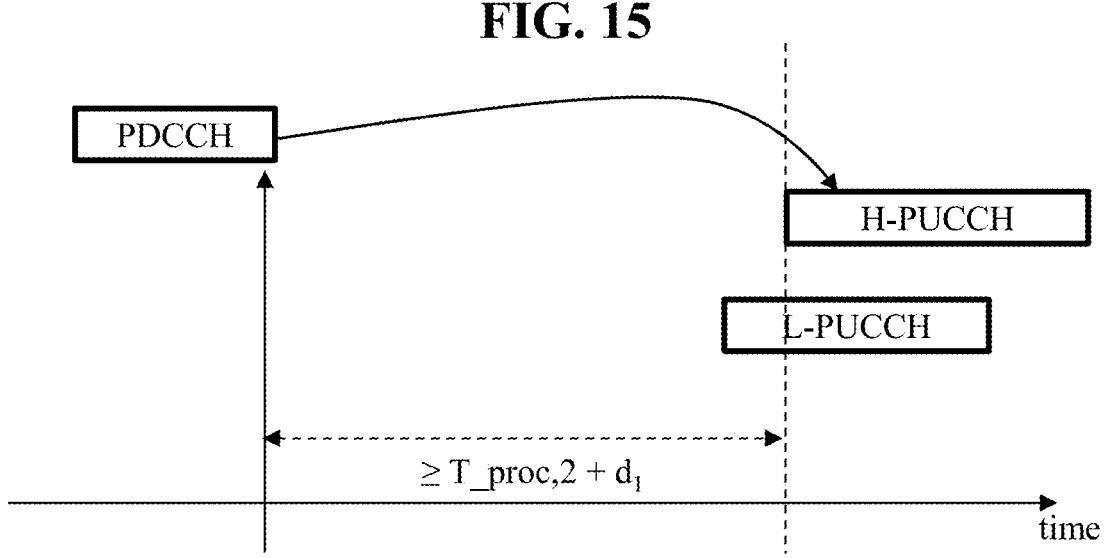
FIG. 15 illustrates a collision situation between PUCCHs with different priorities.
Figure 16:
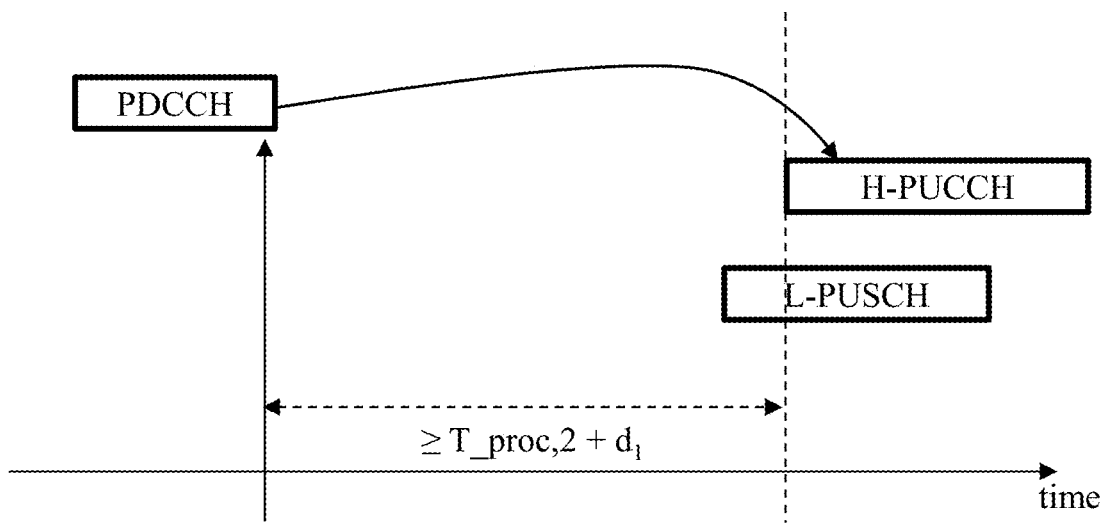
FIGS. 16 and 17 illustrate collision situations between a PUSCH and a PUCCH with different priorities.
Figure 17:
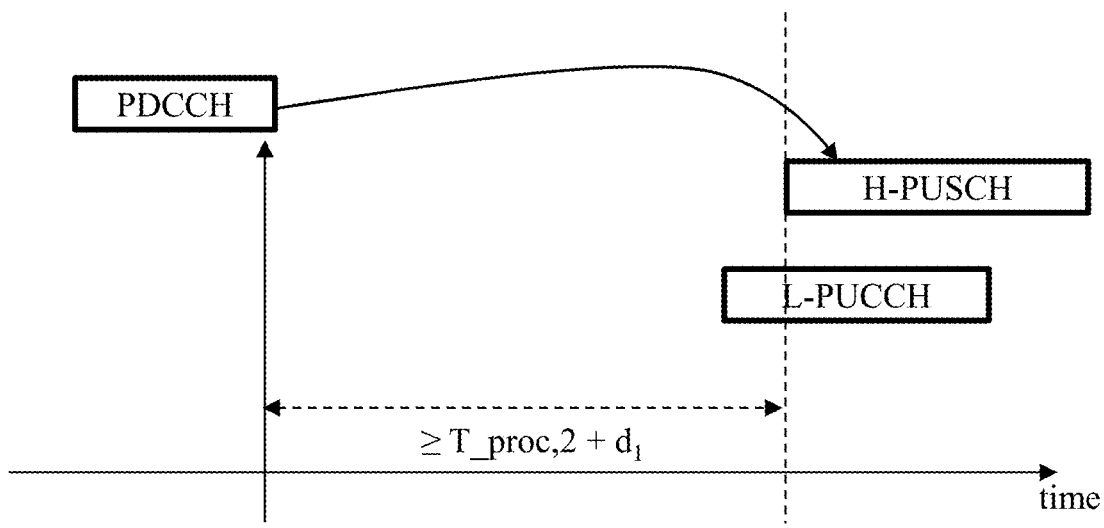

FIG. 15 illustrates a collision situation between PUCCHs with different priorities, and FIGS. 16 and 17 illustrate collision situations between a PUSCH and a PUCCH with different priorities. Referring to FIG. 15, when a higher priority H-PUCCH scheduled (i.e., triggered) by a DCI format in PDCCH reception overlaps in time with a lower priority L-PUCCH, the UE may cancel transmission of the L-PUCCH before the first symbol overlapping with the H-PUCCH. In this case, depending on UE implementations, transmission of the entire L-PUCCH may be canceled, or transmission of a portion of the L-PUCCH that overlaps with the H-PUCCH may be canceled. Consequently, transmission of at least the portion of the L-PUCCH overlapping with the H-PUCCH may be canceled.

Referring to FIG. 16, when a higher priority H-PUCCH scheduled (i.e., triggered) by a DCI format in PDCCH reception overlaps in time with a lower priority L-PUSCH, the UE may cancel transmission of the L-PUSCH before the first symbol overlapping with the H-PUCCH. Depending on UE implementations, transmission of the entire L-PUSCH may be canceled, or transmission of a portion of the L-PUSCH overlapping with the H-PUCCH may be canceled. Consequently, transmission of at least the portion of the L-PUSCH overlapping with the H-PUCCH may be canceled.

Referring to FIG. 17, when a higher priority H-PUSCH scheduled by a DCI format in PDCCH reception overlaps in time with a lower priority L-PUCCH, the UE may cancel transmission of the L-PUCCH before the first symbol overlapping with the H-PUSCH. Depending on UE implementations, transmission of the entire L-PUCCH may be canceled, or transmission of a portion of the L-PUCCH overlapping with the H-PUSCH may be canceled. Consequently, transmission of at least the portion of the L-PUCCH overlapping with the H-PUSCH may be canceled.

In FIGS. 15 to 17, the UE may expect that transmission of the H-PUCCH or H-PUSCH will not start before $T\_proc,2+d_i$ from the last symbol of the PDCCH reception, where $T\_proc,2$ is a PUSCH preparation time for a corresponding UE processing capability on the assumption of $d_{2,1}$ based on u and $N_2$, and $d_i$ is determined by a reported UE capability. For example, the value of a parameter push-PreparationLowPriority reported by the UE to the BS may be used as $d_1$.

Specifically, referring to 3GPP TS 38.213 V16.2.0, when the UE is scheduled by a DCI format in a first PDCCH to transmit a first PUCCH or first PUSCH with a higher priority, which overlaps with a second PUCCH or second PUSCH with a lower priority scheduled by a DCI format in a second PDCCH, > $T\_proc,2$ may be based on the value of u corresponding to the smallest SCS configuration among the first PDCCH, the second PDCCHs, the first PUCCH or the first PUSCH, and the second PUCCHs or the second PUSCHs.

>> If the overlapping group includes the first PUCCH,

>>> If a parameter processingType2Enabled in an RRC configuration PDSCH-ServingCellConfig, which is used to configure common UE-specific PDSCH parameters over BWPs of UEs in one serving cell, is set to be enabled for the serving cell where the UE receives the first PDCCH and for all serving cells where the UE receives PDSCHs corresponding to the second PUCCHs, and if processing Type2Enabled of PDSCH-ServingCellConfig is set to be enabled for serving cells with the second PUSCHs, $N_2$ may be 5 for u=0, 5.5 for u=1, and 11 for u=2.

>>> Else, $N_2$ may be 10 for u=0, 12 for u=1, 23 for u=2, and 36 for u=3.

> If the overlapping group includes the first PUSCH,

>> If processingType2Enabled of PDSCH-ServingCellConfig is set to be enabled for serving cells with the first PUSCH and the second PUSCHs, and if processing Type2Enabled of PDSCH-ServingCellConfig is set to be enabled for all serving cells where the UE receives PDSCHs corresponding to the second PDCCHs, $N_2$ may be 5 for u=0, 5.5 for u=1, and 11 for u=2.

>>> Else, $N_2$ may be 10 for u=0, 12 for u=1, 23 for u=2, and 36 for u=3.

The parameter processingType2Enabled may be used to enable the configuration of an advanced processing time capability for a PDSCH.

When a collision occurs between PUCCHs with different priorities or between a PUCCH and a PUSCH with different priorities, the conventional 3GPP-based communication system may guarantee the UE processing time based on an extended scheduling timeline and enable a lower priority UL transmission to be canceled before a higher priority UL transmission as illustrated in FIGS. 15 to 17. In other words, in the conventional 3GPP-based communication system, the UE needs to cancel transmission of an L-PUCCH or L-PUSCH at the latest before the first symbol overlapping with an H-PUCCH, where the L-PUCCH or L-PUSCH overlaps in time with the H-PUCCH starting after at least T_proc,1+$d_i$ from the last symbol of a PDCCH. In addition, the UE needs to cancel transmission of an L-PUCCH at the latest before the first symbol overlapping with an H-PUSCH, where the L-PUCCH overlaps in time with the corresponding H-PUSCH starting after at least T_proc,1+$d_i$ from the last symbol of the PDCCH. FIGS. 15 to 17 illustrate cases in which transmission of a lower priority UL channel is triggered/scheduled to start before transmission of a higher priority UL channel. However, for an L-PUSCH/L-PUCCH that overlaps with a higher priority UL channel satisfying the time condition of T_proc,1+$d_1$ and is scheduled/triggered to start later than the higher priority UL channel, the UE may cancel transmission of the L-PUSCH/L-PUCCH before the first overlapping symbol. When the lower priority UL channel is scheduled/triggered to start later than the higher priority UL channel, the UE may cancel transmission of the entire L-PUSCH/L-PUCCH because the L-PUSCH/L-PUCCH overlaps with the higher priority UL channel from the start symbol of the L-PUSCH/L-PUCCH.

For collisions between PUSCHs with different priorities, the conventional 3GPP-based communication system considers only a collision between configured grant PUSCHs, which are semi-statically configured so that it is difficult for the BS to avoid the collision based on scheduling. That is, the conventional 3GPP-based communication system does not consider a collision between different types of PUSCHs with different priorities (e.g., an overlap in time between a configured grant-based PUSCH and a dynamic grant-based PUSCH having different priorities or an overlap in time between dynamic grant-based PUSCHs having different priorities). Since PUSCH transmission is based on a transport block (TB) provided by a medium access (MAC) layer, not only physical layer operations but also MAC layer operations need to be considered to cancel transmission of some PUSCHs among overlapping PUSCHs. It has been regulated that the UE shall not expect an overlap in time between PUSCHs with different priorities, and thus, the BS has been expected to schedule the PUSCHs with different priorities not to overlap in time with each other. However, if the BS configures a plurality of configured grant (CG) PUSCHs, it may be difficult for the BS to schedule a PDCCH-based PUSCH (i.e., dynamic grant based PUSCH) not to overlap with the CG PUSCHs because the CG PUSCHs are expected to occupy a significant amount of resources. In some cases, the BS may desire to dynamically schedule another PUSCH (hereinafter referred to as a second PUSCH) in a state that the BS schedules a dynamic grant (DG) based PUSCH (hereinafter referred to as a first PUSCH) to the UE. However, according to the conventional 3GPP-based wireless system, the BS has a constraint that the second PUSCH needs to be scheduled in such a way that the second PUSCH does not overlap in time with the first PUSCH. Recently, to enable the BS to freely schedule PUSCHs, it is considered that the BS is allowed to schedule the PUSCHs such that a CG-based PUSCH and a DG-based PUSCH with different priorities overlap in time or DG-based PUSCHs with different priorities overlap in time.

According to the collision resolution method illustrated in FIG. 14, when UL transmission with different priorities are allocated within one slot consisting of 14 symbols or a subslot consisting of fewer than 14 symbols (e.g., 2 or 7), the UE may perform multiplexing for each priority. If there is a collision between channels after the multiplexing is performed, the UE may perform UL transmission with a higher priority without transmitting a lower priority channel.

The collision resolution process illustrated in FIG. 14 is effective in protecting higher priority transmission but has a problem in that lower priority UL transmission may not be properly transmitted. In particular, for latency-tolerant lower priority traffic, one PUCCH may carry dozens of HARQ-ACK feedbacks. Thus, if the PUCCH transmission is lost, DL scheduling may occur dozens of times to recover the loss.

In the present disclosure, methods and procedures for multiplexing lower priority UL transmission with higher priority UL transmission to the extent that a multiplexing result does not affect the latency or reliability of the higher priority UL transmission will be described. In other words, methods of multiplexing lower priority UL transmission with higher priority UL transmission without any loss while minimizing impacts on the performance of the higher priority UL transmission will be described in this document. For example, methods and procedures for selecting a multiplexing target in lower priority transmission and methods and procedures for performing inter-priority multiplexing will be described.

Figure 18:
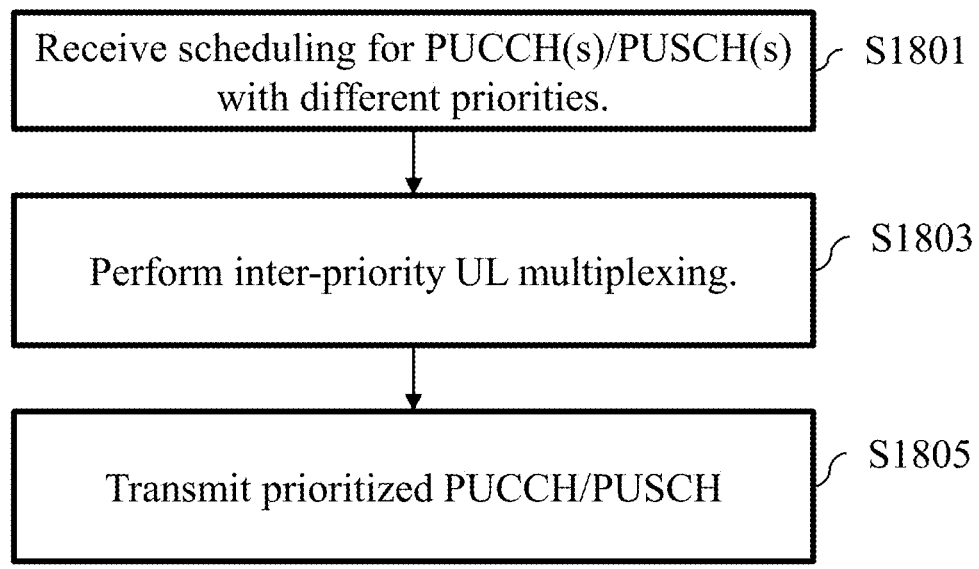
FIG. 18 illustrates a flow of UL channel transmission of a UE according to some implementations of the present disclosure.

UE Side:

FIG. 18 illustrates a flow of UL channel transmission at the UE according to some implementations of the present disclosure.

The UE may be configured with higher layer parameter(s) (e.g., PUCCH-config, PUSCH-config, etc.) necessary for transmitting a PUCCH/PUSCH for each priority. When there is a collision between UL channels (i.e., when UL channels overlap in time), the UE may perform inter-priority UL multiplexing according to some implementations of the present disclosure. For example, according to some implementations of the present disclosure, the UE may operate as follows.

The UE may receive RRC configurations (pucch-ConfigurationList-r16, multiple PUCCH-config included in pucch-ConfigurationList-r16, and PUSCH-config that includes priorityIndicatorDCI-0-1 and priorityIndicatorDCI-0-2, etc.) for UL transmissions with different priorities from the BS. The RRC configuration may be received for each priority. The UE may be scheduled with PUCCH and/or PUSCH transmissions with different priorities by the BS (S1801). If the PUCCH and/or PUSCH transmissions are scheduled to overlap in time, the UE may perform inter-priority UL multiplexing according to some implementations of the present disclosure (S1803). The UE may transmit a prioritized PUCCH and/or PUSCH (S1805).

In some implementations of the present disclosure, the UE may operate as follows.

<Implementation A1> UL Multiplexing Timelines for Inter-Priority Multiplexing

When considering a minimum required processing time, the UE may apply an additional time offset for reasons such as multiplexing UL channels with different priorities or checking whether multiplexing is allowed. The additional time offset may have a predetermined value or a value determined by the BS through L1 signaling (e.g., PDCCH) or higher layer signaling.

In some scenarios, to determine whether multiplexing between UL channels is allowed, the UE may check whether the earliest start symbol of a UL channel is capable of securing a sufficient processing time from the time of receiving DCI scheduling the UL channel. For example, the UE may determine whether multiplexing is allowed for various UCI types based on the following content, which is defined in Section 9.2.5 of 3GPP TS 38.213.

When the UE is provided with an RRC parameter simultaneousHARQ-ACK-CSI, the UE multiplexes DL HARQ-ACK information with or without an SR and CSI report(s) on the same PUCCH. Otherwise, the UE drops the CSI report(s) and includes only the DL HARQ-ACK information with or without the SR in the PUCCH. If the UE intends to transmit multiple PUCCHs including HARQ-ACK information and CSI report(s) in one slot, the UE expects to be provided with the same configuration for simultaneousHARQ-ACK-CSI for each of PUCCH formats 2, 3, and 4.

If the UE multiplexes CSI reports including Part 2 CSI reports on a PUCCH resource, the UE determines the PUCCH resource and the number of PRBs for the PUCCH resource, or the number of Part 2 CSI reports by assuming that each of the CSI reports indicates rank 1.

If the UE would transmit multiple overlapping PUCCHs in a slot or overlapping PUCCH(s) and PUSCH(s) in a slot, if the UE is configured to multiplex different UCI types on one PUCCH, and if at least one of the multiple overlapping PUCCHs or PUSCHs is in response to DCI format detection by the UE, the UE multiplexes all corresponding UCI types if the following condition is satisfied. If one of the PUCCH transmissions or PUSCH transmissions is in response to the DCI format detection by the UE, the UE expects that the first symbol $S_0$ of the earliest PUCCH or PUSCH in a group of overlapping PUCCHs and PUSCHs in a slot satisfies the following timeline condition.

> $S_0$ is not before a symbol with a CP starting after $T^{mux}_{proc,1}$ from the last symbol of any corresponding PDSCH, where $T^{mux}_{proc,1}$ is given by the maximum of $\{T^{mux,1}_{proc,1}, \ldots, T^{mux,i}_{proc,1}, \ldots\}$. For an i-th PDSCH with corresponding HARQ-ACK transmission on a PUCCH, which is included in the group of overlapping PUCCHs and PUSCHs, $T^{mux,i}_{proc,1}=(N_1+d_{1,1}+1)*(2048+144)*\kappa*2^{-u}*T_c$, where $d_{1,1}$ is selected for the i-th PDSCH (see $d_{1,1}$ described in FIG. 12), and $N_1$ is selected based on the UE PDSCH processing capability for the i-th PDSCH and an SCS configuration u, where u corresponds to the smallest SCS configuration among SCS configurations used for a PDCCH scheduling the i-th PDSCH (if any), a PUCCH with corresponding HARQ-ACK transmission for the i-th PDSCH, and all PUSCHs in the group of overlapping PUCCHs and PUSCHs.

> $S_0$ is not before a symbol with a CP starting after $T^{mux}_{proc,release}$ from the last symbol of any corresponding SPS PDSCH release or DCI format 1_1 indicating SCell dormancy. DCI format 1_1 may include a SCell dormancy indication field, and the SCell dormancy indication field is a bitmap having the same size as the number of configured SCell groups, which is provided by the BS through an RRC parameter Scell-groups-for-dormancy-within-active-time. The bits of the bitmap correspond to the configured SCell groups, respectively (see Section 10.3 of 3GPP TS 38.213). $T^{mux}_{proc,release}$ is given by the maximum of $\{T^{mux,1}_{proc,2}, \ldots, T^{mux,i}_{proc,2}, \ldots\}$. For an i-th PDCCH providing SPS PDSCH release or DCI format 1_1 with corresponding HARQ-ACK transmission on a PUCCH, which is in the group of overlapping PUCCHs and PUSCHs, $T^{mux,i}_{proc,release}=(N+1)*(2048+144)*\kappa*2^{-u}*T_c$, where N is selected based on the UE PDSCH processing capability for i-th SPS PDSCH release or DCI format 1_1 and the SCS configuration u. In this case, u corresponds to the smallest SCS configuration among SCS configurations used for a PDCCH providing the i-th SPS PDSCH release, a PUCCH with corresponding HARQ-ACK transmission for the i-th SPS PDSCH release or DCI format 1_1, and all PUSCHs in the group of overlapping PUCCHs and PUSCHs. If an RRC parameter processingType2Enabled in PDSCH-Serving-CellConfig provided by the BS is set to be enabled for a serving cell with the PDCCH providing the SPS PDSCH release, N=5 for u=0, N=5.5 for u=1, and N=11 for u=2. Otherwise, N=10 for u=0, N=12 for u=1, N=22 for u=2, and N=25 for u=3.

> If there is no aperiodic CSI report multiplexed on a PUSCH in the group of overlapping PUCCHs and PUSCHs, $S_0$ is not before a symbol with a CP starting after $T^{mux}_{proc,2}$ from the last symbol of the following: i) any PDCCH with a DCI format scheduling an overlapping PUSCH; and ii) any PDCCH scheduling a PDSCH or SPS PDSCH release with corresponding HARQ-ACK information in an overlapping PUCCH in a slot.

If there is at least one PUSCH in the group of overlapping PUCCHs and PUSCHs, $T^{mux}_{proc,2}$ is given by the maximum of $\{T^{mux,1}_{proc,2}, \ldots, T^{mux,i}_{proc,2}, \ldots\}$. For an i-th PUSCH in the group of overlapping PUCCHs and PUSCHs, $T^{mux,i}_{proc,2}=\max\{(N_2+d_{2,1}+1)*(2048+144)*\kappa*2^{-u}*T_c+T_{switch}, d_{2,2}\}$, where $d_{2,1}$, $d_{2,2}$, and $T_{switch}$ are selected for the i-th PUSCH (see 3GPP TS 38.214), and $N_2$ is selected based on the UE PUSCH processing capability for the i-th PUSCH and SCS configuration u, where u corresponds to the smallest SCS configuration among SCS configurations used for a PDCCH scheduling the i-th PUSCH (if any), PDCCHs scheduling PDSCHs with corresponding HARQ-ACK transmission on a PUCCH in the group of overlapping PUCCHs and PUSCHs, and all PUSCHs in the group of overlapping PUCCHs and PUSCHs.

If there is no PUSCH in the group of overlapping PUCCHs and PUSCHs, $T^{mux}_{proc,2}$ is given by the maximum of $\{T^{mux,1}_{proc,2}, \ldots, T^{mux,i}_{proc,2}, \ldots\}$. For an i-th PDSCH with corresponding HARQ-ACK transmission on a PUCCH in a group of overlapping PUCCHs, $T^{mux,i}_{proc,2}=(N_2+1)*(2048+144)*\kappa*2^{-u}*T_c$, where $N_2$ is selected based on the UE PUSCH processing capability for a PUCCH serving cell if configured. If no PUSCH processing capability is configured for the PUCCH serving cell, $N_2$ is selected based on UE PUSCH processing capability 1. In addition, u is selected based on the smallest SCS configuration among an SCS configuration used for a PDCCH scheduling the i-th PDSCH (if any) with corresponding HARQ-ACK transmission on a PUCCH in the group of overlapping PUCCHs and an SCS configuration for the PUCCH serving cell.

If there is an aperiodic CSI report multiplexed on a PUSCH in the group of overlapping PUCCHs and PUSCHs, $S_0$ is not before a symbol with a CP starting after $T^{mux}_{proc,CSI}=\max\{(Z+d)*(2048+144)*\kappa*2^{-u}*T_c+T_{switch}, d_{2,2}\}$ from the last symbol of the following: i) any PDCCH with a DCI format scheduling an overlapping PUSCH; and ii) any PDCCH scheduling a PDSCH or SPS PDSCH release or providing DCI format 1_1 indicating SCell dormancy with corresponding HARQ-ACK information on an overlapping PUCCH in a slot, where u corresponds to the smallest SCS configuration among SCS configurations of PDCCHs, the smallest SCS configuration for a group of overlapping PUSCHs, and the smallest SCS configuration of a CSI-RS associated with the DCI format scheduling the PUSCH with the multiplexed aperiodic CSI report, and d=2 for u=0 or 1, d=3 for u=2, and d=4 for u=3.

> $N_1$, $N_2$, $d_{1,1}$, $d_{2,1}$, $d_{2,2}$, and Z are defined in 3GPP TS 38.214, and $\kappa$ and $T_c$ are defined in 3GPP TS 38.211.

In the above descriptions, $T^{mux}_{proc,1}$, $T^{mux}_{proc,release}$, $T^{mux}_{proc,2}$, and $T^{mux}_{proc,CSI}$ mean minimum time gaps between the earliest start symbols of UL channels involved in UL multiplexing and reception of DL channels indicating/causing the UL multiplexing.

When the UE checks the timeline condition or determines whether multiplexing is allowed based on the minimum time gap, if UL channels involved in multiplexing (i.e., UL channels subject to determination of the time gap) do not have the same priority (that is, if at least one UL channel has a priority different from those of other UL channel(s)), the minimum time gaps may be extended by applying the absolute time length $T_{priority}$ of the additional time offset $d_{priority}$. For example, $T^{mux}_{proc,1}+T_{priority}$ may be used as the minimum time gap, instead of determined $T^{mux}_{proc,1}$. Alternatively, to determine the minimum time gap, the symbol length of the additional time offset $d_{priority}$ may be applied to determine the value(s) of an i-th UL channel among overlapping PUSCHs and/or PUCCHs, that is, $T^{mux,i}_{proc,1}$, $T^{mux,i}_{proc,release}$, and/or $T^{mux,i}_{proc,2}$. For example, the following Equations may be used when $T^{mux,i}_{proc,1}$, $T^{mux,i}_{proc,release}$, and/or $T^{mux,i}_{proc,2}$ are determined.

$$T^{mux,i}_{proc,release}=(N+1+d_{priority})*(2048+144)*\kappa*2^{-u}*T_c,$$

$$T^{mux,i}_{proc,2}=\max\{(N_2+d_{2,1}+1+d_{priority})*(2048+144)*\kappa*2^{-u}*T_c+T_{switch},d_{2,2}\}.$$

If there is at least one PUSCH in a group of overlapping PUCCHs and PUSCHs, $T^{mux,i}_{proc,2}=\max\{(N_2+d_{2,1}+1+d_{priority})*(2048+144)*\kappa*2^{-u}*T_c+T_{switch}, d_{2,2}\}$. If there is no PUSCH in the group of overlapping PUSCHs and PUSCHs, $T^{mux,i}_{proc,2}=\max\{(N_2+1+d_{priority})*(2048+144)*\kappa*2^{-u}*T_c\}$.

When the UE performs UL multiplexing between different priorities, the UE may apply the additional offset described in Implementation A1, and thus, the UE may be guaranteed an additional processing time, compared to when performing multiplexing on UL channels with the same priority. Accordingly, the implementation complexity of inter-priority multiplexing of the UE may be reduced. In particular, it may be useful when the UE uses a different processing unit for each priority (e.g., a baseband processing unit for each priority).

<Implementation A2> UL Multiplexing Condition for Latency

When the UE multiplexes UL channels having different priorities or checks whether multiplexing is allowed, the UE may consider the position of an ending symbol of a lower priority transmission channel. For example, the ending symbol of the lower priority transmission channel needs to be earlier than the ending symbol of any higher priority UL channel among UL channels to be multiplexed, or the ending symbol of the lower priority transmission channel needs to be separated from the ending symbol of the higher priority UL channel within a prescribed symbol length, $T_{latency}$. Alternatively, only lower priority transmission channels may be subject to multiplexing. For example, the last symbol E of the latest PUCCH or PUSCH with a lower priority in a group of overlapping PUCCHs and PUSCHs in a slot is expected to satisfy the following timeline condition: the last symbol E is not after a symbol with a CP starting after $T_{latency}$ from the last symbol of any higher priority PUCCH or PUSCH in the group of overlapping PUCCHs and PUSCHs in the slot.

$T_{latency}$ may be determined by L1 signaling or higher layer signaling from the BS or have a predetermined value. For $T_{latency}=0$, the ending symbol of a lower priority transmission channel needs to always be the same as or earlier than the ending symbol of a higher priority UL channel among UL channels to be multiplexed. Alternatively, only lower priority transmission channels may be subject to multiplexing.

<Implementation A3> Performing Per-Priority Multiplexing First and then Inter-Priority Multiplexing For inter-priority UL multiplexing, UL multiplexing may be performed for each priority first. When performing multiplexing for each priority, the UE may acquire non-overlapping UL channel(s) for each priority in one slot. Then, if there is a UL channel collision between UL channels with different priorities (that is, if UL channels with different priorities overlap in time), the UE may perform inter-priority UL multiplexing as follows.

> For an LP PUSCH and an HP PUSCH, the UE may transmit the HP PUSCH without transmitting at least overlapping symbols of the LP PUSCH. For example, when the LP PUSCH and HP PUSCH overlap with each other, the UE may cancel transmission of the LP PUSCH before the first symbol in which the LP PUSCH and HP PUSCH overlap.

> For an LP PUCCH and an HP PUSCH,

>> If the HP PUSCH is transmitted, including UCI of an HP PUCCH or DCI-triggered HP UCI, the UE may transmit the HP PUSCH without transmitting at least overlapping symbols of the LP PUCCH. For example, if the HP PUSCH is transmitted, including the UCI of the HP PUCCH or DCI-triggered HP UCI, the UE may cancel transmission of the LP PUCCH before the first symbol in which the LP PUCCH and HP PUSCH overlap.

>> The UE may check the multiplexing timeline condition between the LP PUCCH and the HP PUSCH. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.

>>> If the LP PUCCH satisfies the multiplexing timeline condition, the UE may transmit an LP PUSCH and the HP PUSCH by multiplexing them. In some implementations of the present disclosure, the multiplexing operation may be performed based on the details described in Section 9 of 3GPP TS 38.213 V16.2.0.

>>> Otherwise, the UE may transmit the HP PUSCH without transmitting the at least overlapping symbols of the LP PUCCH.

> For an LP PUSCH and an HP PUCCH,

>> If the LP PUSCH is transmitted, including UCI of an LP PUCCH or DCI-triggered LP UCI, the UE may transmit the HP PUCCH without transmitting the LP PUSCH.

>> The UE may check the multiplexing timeline condition between the LP PUSCH and HP PUCCH. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.

>>> When the LP PUSCH satisfies the multiplexing timeline condition with the HP PUCCH, the UE may transmit the LP PUSCH and an HP PUSCH by multiplexing them. In some implementations of the present disclosure, the multiplexing operation may be performed based on the details described in Section 9 of 3GPP TS 38.213 V16.2.0. In this case, for a beta offset parameter for UL multiplexing, a value configured for an HP UL channel may be used.

Alternatively, if the beta offset parameter is configured separately for inter-priority UL multiplexing, the corresponding parameter may be used.

>>> Otherwise, the UE may transmit the HP PUCCH without transmitting at least overlapping symbols of the LP PUSCH.

> For an LP PUCCH and an HP PUCCH,

>> The UE may check the multiplexing timeline condition between an LP PUSCH and the HP PUCCH. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.

>>> When the LP PUCCH satisfies the multiplexing timeline condition with the HP PUCCH, the UE may transmit the LP PUCCH and the HP PUCCH by multiplexing them.

In some implementations of the present disclosure, the multiplexing operation may be performed based on the details described in Section 9 of 3GPP TS 38.213 V16.2.0. In this case, for all parameter(s) for selecting a PUCCH resource set in UL multiplexing, values configured for the HP channel may be used. Alternatively, if the parameter(s) are configured separately for inter-priority UL multiplexing, the corresponding parameter(s) may be used.

>>>> Since conventional multiplexing (e.g., multiplexing according to section 9 of 3GPP TS 38.213 V16.2.0) may cause additional collisions due to a change in the position of a PUCCH, multiplexing may be performed based on the following operations to prevent the additional collisions. The resource set of the HP PUCCH may be maintained as a selected resource set. That is, UCI included in the LP PUCCH may be added to bits of UCI included in the current HP PUCCH within a range that does not exceed maxPayloadSize configured (by RRC signaling) for the resource set of the HP PUCCH so that the UCI included in the LP PUCCH may be included in the HP PUCCH (for multiplexing). As a PUCCH resource identifier, the resource identifier of the HP PUCCH may be maintained.

>>>> Alternatively, in more general, the UE may multiplex one or more LP UCIs included in the LP PUCCH and one or more HP UCIs included in the HP PUCCH onto the same one PUCCH thereby transmitting them, as follows.

>>>>> Option 1: The UE may selectively multiplex only an LP HARQ-ACK (and/or LP SR) among the LP UCIs with the HP UCIs or selectively multiplex only LP UCIs except for LP CSI among the LP UCIs with the HP UCIs. If a UCI payload obtained by combining the selected LP UCIs and the HP UCIs does not exceed the maximum UCI payload transmitted over the PUCCH, the UE may apply Option 1. If the UCI payload exceeds the maximum UCI payload, the UE drops all the LP UCIs thereby not transmitting them. In other words, if the multiplexing timeline condition is satisfied, the UE may apply Option 1. If the multiplexing timeline condition is not satisfied, the UE drops all the LP UCIs thereby not transmitting them. In this case, the multiplexing timeline condition may include the multiplexing timeline condition described in Sections 9.2.5 and 9 of 3GPP TS 38.213 V16.2.0 and/or the multiplexing timeline condition described in Implementation A1 and Implementation A2 of the present disclosure.

>>>>> Option 2: The UE may sequentially multiplex all or part of the LP UCIs with the HP UCIs according to the following LP UCI priorities: LP HARQ-ACK>LP SR>LP CSI or LP HARQ-ACK=LP SR>LP CSI. In this case, the UE may sequentially multiplex the LP UCIs with the HP UCIs, starting from LP UCI having a higher priority until a UCI payload obtained by combining the HP UCIs and LP UCIs does not exceed the maximum UCI payload transmitted over the PUCCH. If the multiplexing timeline condition is satisfied, the UE may apply Option 2. If the multiplexing timeline condition is not satisfied, the UE drops all the LP UCIs thereby not transmitting them. In this case, the multiplexing timeline condition may include the multiplexing timeline condition described in Sections 9.2.5 and 9 of 3GPP TS 38.213 V16.2.0 and the multiplexing timeline condition described in Implementation A1 and/or Implementation A2 of the present disclosure.

>>> Otherwise (that is, when the LP PUCCH does not satisfy the multiplexing timeline condition with the HP PUCCH), the UE may transmit the HP PUCCH without transmitting at least overlapping symbols of the LP PUCCH.

Some of the multiplexing cases described above (e.g., LP PUSCH vs. HP PUCCH) may be excluded to reduce the implementation complexity of the UE. In this case, the prior art may be used (for example, transmission of overlapping LP PUSCHs may be canceled), or an HP UL channel may be transmitted without transmitting at least overlapping symbol(s) of an LP UL channel.

If a plurality of LP UL channels collide with one HP UL channel, the UE may perform UL multiplexing of the LP UL channels sequentially from an LP UL channel preceding in chronological order, perform multiplexing of all LP UL channels at the same time, or perform multiplexing of only the most advanced LP UL channel in chronological order without transmitting other LP UL channels, which is to reduce the implementation complexity of the UE.

If a plurality of HP UL channels collide with one LP UL channel, the UE may perform multiplexing of all HP UL channels at the same time or transmit the plurality of HP UL channels without transmitting the LP UL channel, which is particularly useful when the timeline condition is not satisfied between one LP UL channel and some HP UL channels.

When the UE would not transmit at least overlapping symbols of an LP UL channel, whether the UE does not transmit only a minimum number of symbols or the entirety of the LP UL channel may be determined according to the capability of the UE or the implementation of the UE. Alternatively, the entire LP UL channel may not be transmitted at all times.

Alternatively, it may be determined according to the type of UL channel. For example, for a PUCCH, the UE may not transmit only a minimum number of symbols and may determine whether to transmit the remaining symbols according to the implementation of the UE. For a PUSCH, the UE may not transmit the entirety of the PUSCH at all times.

If PUCCH(s) and/or PUSCH(s), which are indicated or configured for one priority and overlapping in time, do not satisfy the multiplexing timeline condition (including the multiplexing timeline condition described in Sections 9.2.5 and 9 of 3GPP TS 38.213 V16.2.0 and/or the multiplexing timeline condition described in Implementation A1 and Implementation A2 of the present disclosure), the UE may not transmit the corresponding PUCCH(s) and/or PUSCH(s). For example, before performing inter-priority UL multiplexing, if a PUCCH and/or PUSCH indicated or configured for a specific priority X does not satisfy the multiplexing timeline condition, and if there is another priority Y for which the PUCCH and/or PUSCH is indicated or configured to satisfy the multiplexing timeline condition, the UE may perform only transmission for the priority Y without performing the inter-priority UL multiplexing. If there are two or more priorities indicated or configured for the corresponding PUCCH(s) and/or PUSCH(s) to satisfy the multiplexing timeline condition, the UE may perform UL multiplexing for those priorities. Alternatively, the UE may perform intra-priority UL multiplexing for the highest single priority.

<Implementation A4> Performing Per-Priority Multiplexing Except PUSCH First and then Inter-Priority Multiplexing To perform inter-priority UL multiplexing, the UE may first perform UL multiplexing by considering only PUCCH(s) for each priority. When the UE performs the multiplexing by considering only the PUCCH(s) for each priority, the UE may obtain non-overlapping PUCCHs and PUSCH channel(s) in one slot for each priority. Then, when an inter-priority UL channel collision occurs, the UE may perform the inter-priority UL multiplexing as follows.

> Step 1: The UE may perform UL multiplexing in consideration of an HP PUCCH. In this case, the HP PUCCH may be multiplexed with an HP PUSCH. Alternatively, the HP PUCCH may be multiplexed with an LP PUCCH and the HP PUSCH. For example, the UE may first perform multiplexing between the LP PUCCH and HP PUCCH. The UE may multiplex a PUCCH, which is obtained as a result of the multiplexing, with the HP PUSCH or multiplex the HP PUCCH with the HP PUSCH without considering the LP PUCCH.

>> The multiplexing operation may be performed based on the details described in Section 9 of 3GPP TS 38.213 V16.2.0. The multiplexing timeline condition used for the multiplexing process may include the timeline condition described in Section 9.2.5 of 3GPP TS 38.213 V16.2.0 and/or the multiplexing timeline condition described in Implementation A1 and/or Implementation A2 of the present disclosure.

>> If the UE performs multiplexing of the LP PUCCH and HP PUCCH first, the UE may check the multiplexing timeline condition between an LP PUCCH and the HP PUCCH. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure. If the LP PUCCH satisfies the multiplexing timeline condition with the HP PUCCH, the UE may transmit the LP PUCCH and HP PUCCH by multiplexing them. The multiplexing operation may be performed based on the details described in Section 9 of 3GPP TS 38.213 V16.2.0. In this case, for all parameter(s) for selecting a PUCCH resource set in UL multiplexing, values configured for the HP channel may be used. Alternatively, if the parameter(s) are configured separately for inter-priority UL multiplexing, the corresponding parameter(s) may be used. In this case, the LP PUCCH subject to multiplexing may be limited to an LP PUCCH that does not overlap with the LP PUSCH.

> Step 2: The UE may resolve a collision between the LP PUSCH and HP UL channel. If there is a collision between the LP PUSCH and HP UL channel, the UE may transmit the HP UL channel without transmitting at least overlapping symbols of the LP PUSCH.

> Step 3: The UE may perform UL multiplexing in consideration of a remaining LP PUCCH after Step 2. This is to prevent system performance degradation that may occur when the LP PUCCH is lost.

>> If there is an LP PUSCH that overlaps with the LP PUCCH but is not yet (fully or partially) dropped, the UE may first multiplex the LP PUCCH with the LP PUSCH.

>> If the HP PUCCH overlaps with the LP PUCCH, the UE may multiplex the LP PUCCH with the HP PUCCH. However, since the conventional multiplexing scheme may cause additional collisions due to a change in the location of a PUCCH, the UE may perform multiplexing as follows to avoid the additional collisions.

>>> The UE may check the multiplexing timeline condition between the LP PUCCH and HP PUCCH. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.

>>> If the LP PUCCH satisfies the multiplexing timeline condition with the HP PUCCH, the UE may transmit the LP PUCCH and HP PUCCH by multiplexing them. The resource set of the HP PUCCH may be maintained as a selected resource set. That is, UCI included in the LP PUCCH may be added to bits of UCI included in the current HP PUCCH within a range that does not exceed maxPayloadSize configured for the resource set of the HP PUCCH so that the UCI included in the LP PUCCH may be included in the HP PUCCH. As a PUCCH resource identifier, the resource identifier of the HP PUCCH may be maintained.

>>> Otherwise, the UE may transmit the HP PUCCH without transmitting at least overlapping symbols of the LP PUCCH.

>> If the HP PUSCH overlaps with the LP PUCCH, the UE may multiplex the LP PUCCH and HP PUSCH. If the HP PUSCH, in which UCI of the HP PUCCH or DCI-triggered HP UCI is included, is transmitted, the UE may transmit the HP PUSCH without transmitting the LP PUCCH.

>>> The UE may check the multiplexing timeline condition between the LP PUCCH and HP PUSCH. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.

>>>> If the LP PUCCH satisfies the multiplexing timeline condition, the UE may transmit the LP PUSCH and HP PUSCH by multiplexing them. The multiplexing operation may be performed based on the details described in Section 9 of 3GPP TS 38.213 V16.2.0.

>>>> Otherwise, the UE may transmit the HP PUSCH without transmitting the at least overlapping symbols of the LP PUCCH.

If a plurality of LP UL channels collide with one HP UL channel, the UE may perform UL multiplexing of the LP UL channels sequentially from an LP UL channel preceding in chronological order, perform multiplexing of all LP UL channels at the same time, or perform multiplexing of only the most advanced LP UL channel in chronological order without transmitting other LP UL channels, which is to reduce the implementation complexity of the UE.

If a plurality of HP UL channels collide with one LP UL channel, the UE may perform multiplexing of all HP UL channels at the same time or transmit the plurality of HP UL channels without transmitting the LP UL channel, which is particularly useful when the timeline condition is not satisfied between one LP UL channel and some HP UL channels.

When the UE would not transmit at least overlapping symbols of an LP UL channel, whether the UE does not transmit only a minimum number of symbols or the entirety of the LP UL channel may be determined according to the capability of the UE or the implementation of the UE. Alternatively, the entire LP UL channel may not be transmitted at all times. Alternatively, it may be determined according to the type of UL channel. For example, for a PUCCH, the UE may not transmit only a minimum number of symbols and may determine whether to transmit the remaining symbols according to the implementation of the UE. For a PUSCH, the UE may not transmit the entirety of the PUSCH at all times.

<Implementation A5> Treating LP HARQ-ACK (+SR) as Higher Priority

As described above, loss of an LP PUCCH may mean loss of a plurality of HARQ-ACK feedbacks, which may require multiple PDSCH retransmissions. To alleviate these problems, the UE may perform multiplexing for each priority by regarding LP PUCCH A carrying specific LP UCI (e.g., LP HARQ-ACK feedback and/or SR) as an HP UL channel under predetermined conditions. The predetermined conditions may include at least one of the following conditions.

- An HP PUCCH exists in a slot in which LP PUCCH A is transmitted.
- An HP PUSCH exists in a slot in which LP PUCCH A is transmitted.
- LP PUCCH A overlaps with any HP PUCCH, and the multiplexing timeline condition between the two channels are satisfied. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.
- LP PUCCH A overlaps with any HP PUSCH, and the multiplexing timeline condition between the two channels are satisfied. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.
- An LP PUSCH overlapping with LP PUCCH A overlaps with other HP UL channels.

When multiplexing is performed by regarding LP PUCCH A as an HP, the LP PUCCH A may not satisfy the multiplexing timeline condition with other HP UL channels depending on considered condition. In this case, the LP PUCCH A may be excluded from HP multiplexing.

The UE may actually perform multiplexing at a different time for each priority. Accordingly, when LP UL multiplexing is performed, LP PUCCH A may be regarded as an LP. When HP UL multiplexing is performed, LP PUCCH A may be regarded as an HP if predetermined condition is satisfied. That is, LP PUCCH A may be involved in UL multiplexing for each priority, and LP PUCCH A may be transmitted repeatedly.

There may be inter-priority UL collisions between UL channels obtained as a result of multiplexing for each priority. In this case, the UE may transmit an HP UL channel by applying Implementation A3 or without transmitting at least overlapping symbols of an LP UL channel.

When the UE would not transmit at least overlapping symbols of an LP UL channel, whether the UE does not transmit only a minimum number of symbols or the entirety of the LP UL channel may be determined according to the capability of the UE or the implementation of the UE. Alternatively, the entire LP UL channel may not be transmitted at all times. Alternatively, it may be determined according to the type of UL channel. For example, for a PUCCH, the UE may not transmit only a minimum number of symbols and may determine whether to transmit the remaining symbols according to the implementation of the UE. For a PUSCH, the UE may not transmit the entirety of the PUSCH at all times.

<Implementation A6> Performing Per-Priority Multiplexing and Inter-Priority Multiplexing in Parallel and Selecting Best UL Channel The UE may perform UL multiplexing for each priority and also perform inter-priority UL multiplexing. The inter-priority UL multiplexing may be performed on the assumption that there are no priorities between UL channels. That is, in some implementations, the same priority may be assumed for all channels involved in the inter-priority multiplexing. In this case, the assumed priority may be the highest priority among the priorities of the channels involved in the UL multiplexing.

Depending on conditions, the UE may select result X obtained by performing UL multiplexing for each priority and result Y obtained by performing inter-priority UL multiplexing. For example, when result Y obtained by performing the UL multiplexing for each priority has fewer UL channels dropped based on scheduling information than result X obtained by performing the inter-priority UL multiplexing, or when result Y has more LP HARQ-ACK feedback to be transmitted than result X, the UE may select result Y obtained by performing the multiplexing for each priority.

<Implementation A7> Same Type of UCI for Different Subslots and Different Priorities According to Implementation A7, a plurality of UCIs may be included in one PUSCH or PUCCH, and the UCIs and the PUSCH or PUCCH may have different priorities. In particular, the same type of UCIs (HARQ-ACK, SR, or CSI) to be transmitted in different subslots and/or with different priorities may be multiplexed on one PUSCH or PUCCH. In this case, the following may be considered.

> When the same type of UCIs with different priorities are included in one PUSCH or PUCCH, the following may be considered.

>> For an SR, an LP SR may not be included in the PUSCH or PUCCH.

>> For CSI, LP CSI may not be included in the PUSCH or PUCCH.

>> For a HARQ-ACK, an LP HARQ-ACK based on the Type-1 HARQ-ACK codebook may not be included in the PUSCH or PUCCH.

>> If LP UCI is included, the LP HARQ-ACK or only the LP HARQ-ACK and LP SR may be included in the PUSCH or PUCCH. Alternatively, all or part of the LP UCI may be included in the PUSCH or PUCCH based on LP HARQ-ACK>LP SR>LP CSI or LP HARQ-ACK=LP SR>LP CSI. If the same type of UCIs with different priorities are included in an HP PUCCH, the resource set of the HP PUCCH may be maintained as a selected resource set. That is, the LP UCI may be added to bits of UCI included in the current HP PUCCH within a range that does not exceed maxPayloadSize configured for the resource set of the HP PUCCH so that the LP UCI may be included in the HP PUCCH.

> When the same type of UCIs with the same priority are included in one PUSCH or PUCCH, the following may be considered.

>> For an SR, only the last SR among positive SRs may be included in the PUSCH or PUCCH.

>> For CSI, only the last CSI may be included in the PUSCH or PUCCH.

>> For a HARQ-ACK, a plurality of HARQ-ACKs may be concatenated and transmitted.

In this case, the plurality of HARQ-ACKs may be concatenated in chronological order of subslots including HARQ-ACK PUCCHs.

<Implementation A8> Selective UCI Multiplexing for HP/LP PUCCH and/or PUSCH Based on UCI Type According to Implementation A8, a plurality of UCIs may be included in one PUSCH. In particular, UCI (e.g., LP UCI) with a specific priority may be included in a PUCCH or PUSCH (e.g., HP PUCCH or HP PUSCH) with a different priority. For example, the same type of UCIs (HARQ-ACK, SR, or CSI) to be transmitted in different subslots and/or with different priorities may be multiplexed on one PUSCH. To minimize the effects of UCIs on the reliability of the PUCCH or PUSCH, specific UCI may be selectively included in the PUCCH or PUSCH. In this case, the following may be considered.

- Among LP UCIs, only an LP HARQ-ACK (and/or LP SR) may be selectively multiplexed with HP UCIs on the PUCCH or PUSCH. Alternatively, among the LP UCIs, only LP UCIs except for LP CSI may be selectively multiplexed with the HP UCIs on the PUCCH or PUSCH.
- All or part of LP UCIs may be sequentially multiplexed with HP UCIs on the PUCCH or PUSCH according to the following LP UCI priorities: LP HARQ-ACK>LP SR>LP CSI or LP HARQ-ACK=LP SR>LP CSI.

In some implementations, one or more LP UCIs included in an LP PUCCH and one or more HP UCIs included in an HP PUCCH may be multiplexed (and transmitted) on the same one PUCCH according to the following options.

- Option 1: Among the LP UCIs, only an LP HARQ-ACK (and/or LP SR) may be selectively multiplexed with the HP UCIs on one PUCCH. Alternatively, among the LP UCIs, only LP UCIs except for LP CSI may be selectively multiplexed with the HP UCIs on one PUCCH. Which LP UCI is to be multiplexed may be configured to the UE by a higher layer (e.g., RRC) configuration from the BS. In some implementations, if a UCI payload obtained by combining the selected LP UCI and the HP UCIs does not exceed the maximum UCI payload transmitted over the PUCCH, the UE may apply Option 1. If the UCI payload exceeds the maximum UCI payload, the UE drops all the LP UCIs thereby not transmitting them. In some implementations, if the multiplexing timeline condition is satisfied, the UE may apply Option 1. If the multiplexing timeline condition is not satisfied, the UE drops all the LP UCIs thereby not transmitting them. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.
- Option 2: All or part of the LP UCIs may be sequentially multiplexed with the HP UCIs on one PUCCH according to the following LP UCI priorities: LP HARQ-ACK>LP SR>LP CSI or LP HARQ-ACK=LP SR>LP CSI. In some implementations, the UE may sequentially multiplex the LP UCIs with the HP UCIs, starting from LP UCI having a higher priority until a UCI payload obtained by combining the HP UCIs and LP UCIs does not exceed the maximum UCI payload transmitted over the PUCCH. In some implementations, if the multiplexing timeline condition is satisfied, the UE may apply Option 2. If the multiplexing timeline condition is not satisfied, the UE drops all the LP UCIs thereby not transmitting them. The multiplexing timeline condition may include the multiplexing timeline condition described in Sections 9.2.5 and 9 of 3GPP TS 38.213 V16.2.0 and the multiplexing timeline condition described in Implementation A1 and/or Implementation A2 of the present disclosure.

In some implementations, one or more LP UCIs included in an LP PUCCH may be multiplexed (and transmitted) on the same one PUSCH as follows.

- Option 1: Among the LP UCIs, only an LP HARQ-ACK (and/or LP SR) may be selectively multiplexed with HP UCIs on one PUSCH. Alternatively, among the LP UCIs, only LP UCIs except for LP CSI may be selectively multiplexed with the HP UCIs on one PUSCH. In some implementations, if REs required for a UCI payload obtained by combining the selected LP UCIs and the HP UCIs do not exceed the maximum REs for the UCI payload, which are determined with a UCI scaling factor of the PUSCH, the UE may apply Option 1. If the REs exceed the maximum REs, the UE drops all the LP UCIs thereby not transmitting them. In other words, the UE may multiplex the HP UCIs first and then multiplex the LP UCIs additionally within a range that does not exceed the maximum UCI payload size. In some implementations, if the multiplexing timeline condition is satisfied, the UE may apply Option 1. If the multiplexing timeline condition is not satisfied, the UE drops all the LP UCIs thereby not transmitting them. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.
- Option 2: All or part of the LP UCIs may be sequentially multiplexed with HP UCIs on one PUSCH according to the following LP UCI priorities: LP HARQ-ACK>LP SR>LP CSI or LP HARQ-ACK=LP SR>LP CSI. In some implementations, the UE may sequentially multiplex the LP UCIs with the HP UCIs, starting from LP UCI having a higher priority until REs required for a UCI payload obtained by combining the selected LP UCIs and the HP UCIs do not exceed the maximum REs for the UCI payload, which are determined with a UCI scaling factor of the PUSCH. In other words, the UE may multiplex the HP UCIs first and then multiplex the LP UCIs additionally within a range that does not exceed the maximum UCI payload size. In some implementations, if the multiplexing timeline condition is satisfied, the UE may apply Option 2. If the multiplexing timeline condition is not satisfied, the UE drops all the LP UCIs thereby not transmitting them. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.

<Implementation A9> Attempting Inter-Priority UL Multiplexing and Selecting UL Channel Based on Timeline Condition Violation The UE may perform inter-priority UL multiplexing first. The inter-priority UL multiplexing may be performed on the assumption that there are no priorities between UL channels. That is, the same priority may be assumed for all channels involved in the multiplexing. In this case, the assumed priority may be the highest priority among the priorities of the channels involved in the multiplexing.

When the channels involved in the inter-priority UL multiplexing do not satisfy the multiplexing timeline condition, the UE may check whether PUCCH(s) and/or PUSCH(s), which are indicated or configured and overlapping in time, satisfy the multiplexing timeline condition for each priority from the highest priority. The UE may perform intra-priority UL multiplexing and transmission only for the highest priority PUCCH(s) and/or PUSCH(s) that satisfy the multiplexing timeline condition. That is, when the inter-priority UL multiplexing violates the multiplexing timeline condition, the UE may perform only the highest priority UL transmission that satisfies the multiplexing timeline condition. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.

Alternatively, if there are two or more priorities indicated or configured for PUCCH(s) and/or PUSCH(s) to satisfy the multiplexing timeline condition, the UE may perform UL multiplexing between the priorities.

As another example, if the channels involved in the inter-priority UL multiplexing do not satisfy the multiplexing timeline condition, and if the highest priority PUCCH(s) and/or PUSCH(s) satisfy the multiplexing timeline condition, the UE may perform intra-priority UL multiplexing and transmission for the PUCCH(s) and/or PUSCH(s) with the corresponding priority.

For example, when two priorities are configured, the UE may operate as follows.

Option 1: When multiplexing timeline condition for each priority (i.e., intra-priority timeline condition) is checked first and then timeline condition between multiple priorities (i.e., inter-priority timeline condition) is checked, Case 1-1: Although the inter-priority timeline condition is checked because each of an LP PUSCH and/or LP PUCCH and an HP PUSCH and/or HP PUCCH satisfies the intra-priority timeline condition, if the above inter-priority timeline condition is not satisfied, LP UCI, the LP PUSCH, and the LP PUCCH may be dropped, and only HP UCI, the HP PUSCH, and/or the HP PUCCH may be transmitted.

Case 1-2: When only one of an LP PUSCH and/or LP PUCCH and an HP PUSCH and/or HP PUCCH (e.g., XP=LP or HP) satisfies the intra-priority timeline condition, only UCI and an PUSCH/PUCCH with corresponding XP may be transmitted, and UCI and an PUSCH/PUCCH with another priority may be dropped. In this case, the operation of checking the inter-priority timeline condition may be skipped.

Option 2: When timeline condition between multiple priorities (i.e., inter-priority timeline condition) is checked first, Case 2-1: When the inter-priority timeline condition is not satisfied for all of an LP PUSCH and/or LP PUCCH and an HP PUSCH and/or HP PUCCH, the intra-priority timeline condition may be checked for each of the LP PUSCH and/or LP PUCCH and the HP PUSCH and/or HP PUCCH. If the HP is satisfied, the UE may drop LP UCI and the LP PUSCH/PUCCH and transmit HP UCI and the HP PUSCH/PUCCH.

Case 2-2: When the inter-priority timeline condition is not satisfied for all of an LP PUSCH and/or LP PUCCH and an HP PUSCH and/or HP PUCCH, the intra-priority timeline condition may be checked for each of the LP PUSCH and/or LP PUCCH and the HP PUSCH and/or HP PUCCH. If only the LP PUSCH/PUCCH is satisfied, the UE may drop HP UCI and the HP PUSCH/PUCCH and transmit LP UCI and the LP PUSCH/PUCCH. Alternatively, if the inter-priority timeline condition is not satisfied, the LP UCI and LP UL channel(s) may be dropped. Then, whether the HP satisfies the intra-priority timeline condition may be checked. When the intra-priority timeline condition is satisfied, the HP UCI and HP PUSCH/PUCCH may be transmitted. When the intra-priority timeline condition is not satisfied, the corresponding HP UCI and HP PUSCH/PUCCH may also be dropped.

BS Side:

The above implementations of the present disclosure will be described again from the perspective of the BS.

Figure 19:
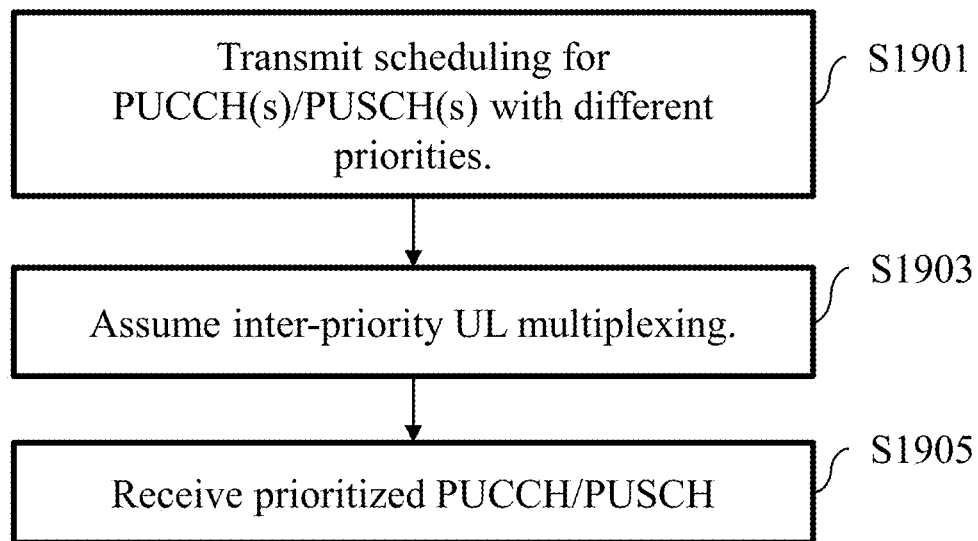
FIG. 19 illustrates a flow of UL channel reception of a BS according to some implementations of the present disclosure.

FIG. 19 illustrates a flow of UL channel reception of the BS according to some implementations of the present disclosure.

The BS may configure to the UE higher layer parameter(s) (e.g., PUCCH-config, PUSCH-config, etc.) necessary for transmitting a PUCCH/PUSCH for each priority. When the UE has a collision between UL channels (i.e., when UL channels overlap in time), the BS may assume that the UE performs inter-priority UL multiplexing according to some implementations of the present disclosure. For example, according to some implementations of the present disclosure, the UE may operate as follows.

The BS may transmit to the UE RRC configurations (pucch-ConfigurationList-r16, multiple PUCCH-config included in pucch-ConfigurationList-r16, PUSCH-config with priorityIndicatorDCI-0-1 and priorityIndicatorDCI-0-2, etc.) for UL transmissions with different priorities. The RRC configuration may be transmitted for each priority. The UE may be scheduled with PUCCH and/or PUSCH transmissions with different priorities from the BS (S1901). If the BS schedules the PUCCH and/or PUSCH transmissions to the UE such that the transmissions overlap in time, the BS may assume that the UE will perform inter-priority UL multiplexing according to some implementations of the present disclosure (S1903). The BS may receive a PUCCH and/or PUSCH prioritized by the UE (S1905).

In some implementations of the present disclosure, the BS may operate as follows.

<Implementation B1> UL Multiplexing Timelines for Inter-Priority Multiplexing

The BS may assume that when considering a minimum required processing time, the UE will apply an additional time offset for reasons such as multiplexing UL channels with different priorities or checking whether multiplexing is allowed. The additional time offset may have a predetermined value or a value determined by the BS through L1 signaling (e.g., PDCCH) or higher layer signaling.

In some scenarios, to determine whether multiplexing between UL channels is allowed, the UE may check whether the earliest start symbol of a UL channel is capable of securing a sufficient processing time from the time of receiving DCI scheduling the UL channel. For example, the UE may determine whether multiplexing is allowed for various UCI types based on the details of Section 9.2.5 of 3GPP TS 38.213 described in Implementation A.

In the details of Section 9.2.5 of 3GPP TS 38.213 described in Implementation A1, $T^{mux}_{proc,1}$, $T^{mux}_{proc,release}$, $T^{mux}_{proc,2}$, and $T^{mux}_{proc,CSI}$ mean minimum time gaps between the earliest start symbols of UL channels involved in UL multiplexing and reception of DL channels indicating/causing the UL multiplexing.

When the UE checks the timeline condition or determines whether multiplexing is allowed based on the minimum time gap, if UL channels involved in multiplexing (i.e., UL channels subject to determination of the time gap) do not have the same priority (that is, if at least one UL channel has a priority different from those of other UL channel(s)), the minimum time gaps may be extended by applying the absolute time length $T_{priority}$ of the additional time offset $d_{priority}$. For example, $T^{mux}_{proc,1}+T_{priority}$ may be used as the minimum time gap, instead of determined $T^{mux}_{proc,1}$. Alternatively, to determine the minimum time gaps, the symbol length of the additional time offset $d_{priority}$ may be applied to determine the value(s) of an i-th UL channel among overlapping PUSCHs and/or PUCCHs, that is, $T^{mux,i}_{proc,1}$, $T^{mux,i}_{proc,release}$, and/or $T^{mux,i}_{proc,2}$. For example, the following Equations may be used when $T^{mux,i}_{proc,1}$, $T^{mux,i}_{proc,release}$, and/or $T^{mux,i}_{proc,2}$ are determined.

$$T^{mux,i}_{proc,release}=(N+1+d_{priority})*(2048+144)*\kappa*2^{-u}*T_c,$$

$$T^{mux,i}_{proc,2}=\max\{(N_2+d_{2,1}+1+d_{priority})*(2048+144)*\kappa*2^{-u}*T_c+T_{switch},d_{2,2}\}.$$

If there is at least one PUSCH in a group of overlapping PUCCHs and PUSCHs, $T^{mux,i}_{proc,2}=\max\{(N_2+d_{2,1}+1+d_{priority})*(2048+144)*\kappa*2^{-u}*T_c+T_{switch},d_{2,2}\}$. If there is no PUSCH in the group of overlapping PUSCHs and PUSCHs, $T^{mux,i}_{proc,2}=\max\{(N_2+1+d_{priority})*(2048+144)*\kappa*2^{-u}*T_c\}$.

When the UE performs UL multiplexing between different priorities, the UE may apply the additional offset described in Implementation B1, and thus, the UE may be guaranteed an additional processing time, compared to when performing multiplexing on UL channels with the same priority. Accordingly, the implementation complexity of inter-priority multiplexing of the UE may be reduced. In particular, it may be useful when the UE uses a different processing unit for each priority (e.g., a baseband processing unit for each priority).

<Implementation B2> UL Multiplexing Condition for Latency

The BS may assume that when the UE multiplexes UL channels having different priorities or checks whether multiplexing is allowed, the UE will consider the position of an ending symbol of a lower priority transmission channel. For example, the ending symbol of the lower priority transmission channel needs to be earlier than the ending symbol of any higher priority UL channel among UL channels to be multiplexed, or the ending symbol of the lower priority transmission channel needs to be separated from the ending symbol of the higher priority UL channel within a prescribed symbol length, $T_{latency}$. Alternatively, only lower priority transmission channels may be subject to multiplexing. For example, the last symbol E of the latest PUCCH or PUSCH with a lower priority in a group of overlapping PUCCHs and PUSCHs in a slot is expected to satisfy the following timeline condition: The last symbol E is not after a symbol with a CP starting after $T_{latency}$ from the last symbol of any higher priority PUCCH or PUSCH in the group of overlapping PUCCHs and PUSCHs in the slot.

$T_{latency}$ may be determined by L1 signaling or higher layer signaling from the BS or have a predetermined value. For $T_{latency}=0$, the ending symbol of a lower priority transmission channel needs to always be the same as or earlier than the ending symbol of a higher priority UL channel among UL channels to be multiplexed. Alternatively, only lower priority transmission channels may be subject to multiplexing.

<Implementation B3> Performing Per-Priority Multiplexing First and then Inter-Priority Multiplexing The BS may assume that for inter-priority UL multiplexing, the UE will perform UL multiplexing for each priority first. When performing multiplexing for each priority, the UE may acquire non-overlapping UL channel(s) for each priority in one slot. Then, the BS may assume that if there is a UL channel collision between UL channels with different priorities (that is, if UL channels with different priorities overlap in time), the UE performs inter-priority UL multiplexing as follows.

> For an LP PUSCH and an HP PUSCH, the UE may transmit the HP PUSCH without transmitting at least overlapping symbols of the LP PUSCH. For example, when the LP PUSCH and HP PUSCH overlap with each other, the UE may cancel transmission of the LP PUSCH before the first symbol in which the LP PUSCH and HP PUSCH overlap.

> For an LP PUCCH and an HP PUSCH,

>> If the HP PUSCH is transmitted, including UCI of an HP PUCCH or DCI-triggered HP UCI, the UE may transmit the HP PUSCH without transmitting at least overlapping symbols of the LP PUCCH. For example, if the HP PUSCH is transmitted, including the UCI of the HP PUCCH or DCI-triggered HP UCI, the UE may cancel transmission of the LP PUCCH before the first symbol in which the LP PUCCH and HP PUSCH overlap.

>> The UE may check the multiplexing timeline condition between the LP PUCCH and the HP PUSCH. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.

>>> If the LP PUCCH satisfies the multiplexing timeline condition, the UE may transmit an LP PUSCH and the HP PUSCH by multiplexing them. In some implementations of the present disclosure, the multiplexing operation may be performed based on the details described in Section 9 of 3GPP TS 38.213 V16.2.0.

>>> Otherwise, the UE may transmit the HP PUSCH without transmitting the at least overlapping symbols of the LP PUCCH.

> For an LP PUSCH and an HP PUCCH,

>> If the LP PUSCH is transmitted, including UCI of an LP PUCCH or DCI-triggered LP UCI, the UE may transmit the HP PUCCH without transmitting the LP PUSCH.

>> The UE may check the multiplexing timeline condition between the LP PUSCH and HP PUCCH. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.

>>> When the LP PUSCH satisfies the multiplexing timeline condition with the HP PUCCH, the UE may transmit the LP PUSCH and an HP PUSCH by multiplexing them. In some implementations of the present disclosure, the multiplexing operation may be performed based on the details described in Section 9 of 3GPP TS 38.213 V16.2.0. In this case, for a beta offset parameter for UL multiplexing, a value configured for an HP UL channel may be used. Alternatively, if the beta offset parameter is configured separately for inter-priority UL multiplexing, the corresponding parameter may be used.

>>> Otherwise, the UE may transmit the HP PUCCH without transmitting at least overlapping symbols of the LP PUSCH.

> For an LP PUCCH and an HP PUCCH,

>> The UE may check the multiplexing timeline condition between an LP PUSCH and the HP PUCCH. The multiplexing timeline condition may include the timeline condition described in Section 9.2.5 of 3GPP TS 38.213

V16.2.0 and/or the multiplexing timeline condition described in Implementation A1 and/or Implementation A2 of the present disclosure.

>>> When the LP PUCCH satisfies the multiplexing timeline condition with the HP PUCCH, the UE may transmit the LP PUCCH and the HP PUCCH by multiplexing them.

>>>> In some implementations of the present disclosure, the multiplexing operation may be performed based on the details described in Section 9 of 3GPP TS 38.213 V16.2.0. In this case, for all parameter(s) for selecting a PUCCH resource set in UL multiplexing, values configured for the HP channel may be used. Alternatively, if the parameter(s) are configured separately for inter-priority UL multiplexing, the corresponding parameter(s) may be used.

>>>> Since conventional multiplexing (e.g., multiplexing according to section 9 of 3GPP TS 38.213 V16.2.0) may cause additional collisions due to a change in the position of a PUCCH, multiplexing may be performed based on the following operations to prevent the additional collisions. The resource set of the HP PUCCH may be maintained as a selected resource set. That is, UCI included in the LP PUCCH may be added to bits of UCI included in the current HP PUCCH within a range that does not exceed maxPayloadSize configured (by RRC signaling) for the resource set of the HP PUCCH so that the UCI included in the LP PUCCH may be included in the HP PUCCH (for multiplexing). As a PUCCH resource identifier, the resource identifier of the HP PUCCH may be maintained.

>>>> Alternatively, in more general, the UE may multiplex one or more LP UCIs included in the LP PUCCH and one or more HP UCIs included in the HP PUCCH and transmit the multiplexed UCIs on the same one PUCCH, as follows.

>>>> Option 1: The UE may selectively multiplex only an LP HARQ-ACK (and/or LP SR) among the LP UCIs with the HP UCIs or selectively multiplex only LP UCIs except for LP CSI among the LP UCIs with the HP UCIs. If a UCI payload obtained by combining the selected LP UCIs and the HP UCIs does not exceed the maximum UCI payload transmitted over the PUCCH, the UE may apply Option 1. If the UCI payload exceeds the maximum UCI payload, the UE drops all the LP UCIs thereby not transmitting them. In other words, if the multiplexing timeline condition is satisfied, the UE may apply Option 1. If the multiplexing timeline condition is not satisfied, the UE drops all the LP UCIs thereby not transmitting them. In this case, the multiplexing timeline condition may include the multiplexing timeline condition described in Sections 9.2.5 and 9 of 3GPP TS 38.213 V16.2.0 and/or the multiplexing timeline condition described in Implementation A1 and Implementation A2 of the present disclosure.

>>>>> Option 2: The UE may sequentially multiplex all or part of the LP UCIs with the HP UCIs according to the following LP UCI priorities: LP HARQ-ACK>LP SR>LP CSI or LP HARQ-ACK=LP SR>LP CSI. In this case, the UE may sequentially multiplex the LP UCIs with the HP UCIs, starting from LP UCI having a higher priority until a UCI payload obtained by combining the HP UCIs and LP UCIs does not exceed the maximum UCI payload transmitted over the PUCCH. If the multiplexing timeline condition is satisfied, the UE may apply Option 2. If the multiplexing timeline condition is not satisfied, the UE drops all the LP UCIs thereby not transmitting them. In this case, the multiplexing timeline condition may include the multiplexing timeline condition described in Sections 9.2.5 and 9 of 3GPP TS 38.213 V16.2.0 and the multiplexing timeline condition described in Implementation A1 and/or Implementation A2 of the present disclosure.

>>> Otherwise (that is, when the LP PUCCH does not satisfy the multiplexing timeline condition with the HP PUCCH), the UE may transmit the HP PUCCH without transmitting at least overlapping symbols of the LP PUCCH.

Some of the multiplexing cases described above (e.g., LP PUSCH vs. HP PUCCH) may be excluded to reduce the implementation complexity of the UE. In this case, the prior art may be used (for example, transmission of overlapping LP PUSCHs may be canceled), or an HP UL channel may be transmitted without transmitting at least overlapping symbol(s) of an LP UL channel.

If a plurality of LP UL channels collide with one HP UL channel, the UE may perform UL multiplexing of the LP UL channels sequentially from an LP UL channel preceding in chronological order, perform multiplexing of all LP UL channels at the same time, or perform multiplexing of only the most advanced LP UL channel in chronological order without transmitting other LP UL channels, which is to reduce the implementation complexity of the UE.

If a plurality of HP UL channels collide with one LP UL channel, the UE may perform multiplexing of all HP UL channels at the same time or transmit the plurality of HP UL channels without transmitting the LP UL channel, which is particularly useful when the timeline condition is not satisfied between one LP UL channel and some HP UL channels.

When the UE would not transmit at least overlapping symbols of an LP UL channel, whether the UE does not transmit only a minimum number of symbols or the entirety of the LP UL channel may be determined according to the capability of the UE or the implementation of the UE. Alternatively, the entire LP UL channel may not be transmitted at all times. Alternatively, it may be determined according to the type of UL channel. For example, for a PUCCH, the UE may not transmit only a minimum number of symbols and may determine whether to transmit the remaining symbols according to the implementation of the UE. For a PUSCH, the UE may not transmit the entirety of the PUSCH at all times.

If PUCCH(s) and/or PUSCH(s), which are indicated or configured for one priority and overlapping in time, do not satisfy the multiplexing timeline condition (including the multiplexing timeline condition described in Sections 9.2.5 and 9 of 3GPP TS 38.213 V16.2.0 and/or the multiplexing timeline condition described in Implementation A1 and Implementation A2 of the present disclosure), the UE may not transmit the corresponding PUCCH(s) and/or PUSCH(s). For example, before performing inter-priority UL multiplexing, if a PUCCH and/or PUSCH indicated or configured for a specific priority X does not satisfy the multiplexing timeline condition, and if there is another priority Y for which the PUCCH and/or PUSCH is indicated or configured to satisfy the multiplexing timeline condition, the UE may perform only transmission for the priority Y without performing the inter-priority UL multiplexing. If there are two or more priorities indicated or configured for the corresponding PUCCH(s) and/or PUSCH(s) to satisfy the multiplexing timeline condition, the UE may perform UL multiplexing for those priorities. Alternatively, the UE may perform intra-priority UL multiplexing for the highest single priority.

The BS may receive the PUSCH or PUCCH expected to be transmitted by the UE according to the above-described operations.

<Implementation B4> Performing Per-Priority Multiplexing Except PUSCH First and then Inter-Priority Multiplexing The BS may assume that the UE will first perform UL multiplexing by considering only PUCCH(s) for each priority to perform inter-priority UL multiplexing. When the UE performs the multiplexing by considering only the PUCCH(s) for each priority, the UE may obtain non-overlapping PUCCHs and PUSCH channel(s) in one slot for each priority. Then, when an inter-priority UL channel collision occurs, the UE may perform the inter-priority UL multiplexing as follows.

> Step 1: The UE may perform UL multiplexing in consideration of an HP PUCCH. In this case, the HP PUCCH may be multiplexed with an HP PUSCH. Alternatively, the HP PUCCH may be multiplexed with an LP PUCCH and the HP PUSCH. For example, the UE may first perform multiplexing between the LP PUCCH and HP PUCCH. The UE may multiplex a PUCCH, which is obtained as a result of the multiplexing, with the HP PUSCH or multiplex the HP PUCCH with the HP PUSCH without considering the LP PUCCH.

>> The multiplexing operation may be performed based on the details described in Section 9 of 3GPP TS 38.213 V16.2.0. The multiplexing timeline condition used for the multiplexing process may include the timeline condition described in Section 9.2.5 of 3GPP TS 38.213 V16.2.0 and/or the multiplexing timeline condition described in Implementation A1 and/or Implementation A2 of the present disclosure.

>> If the UE performs multiplexing of the LP PUCCH and HP PUCCH first, the UE may check the multiplexing timeline condition between an LP PUCCH and the HP PUCCH. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure. If the LP PUCCH satisfies the multiplexing timeline condition with the HP PUCCH, the UE may transmit the LP PUCCH and HP PUCCH by multiplexing them. The multiplexing operation may be performed based on the details described in Section 9 of 3GPP TS 38.213 V16.2.0. In this case, for all parameter(s) for selecting a PUCCH resource set in UL multiplexing, values configured for the HP channel may be used. Alternatively, if the parameter(s) are configured separately for inter-priority UL multiplexing, the corresponding parameter(s) may be used. In this case, the LP PUCCH subject to multiplexing may be limited to an LP PUCCH that does not overlap with the LP PUSCH.

> Step 2: The UE may resolve a collision between the LP PUSCH and HP UL channel. If there is a collision between the LP PUSCH and HP UL channel, the UE may transmit the HP UL channel without transmitting at least overlapping symbols of the LP PUSCH.

> Step 3: The UE may perform UL multiplexing in consideration of a remaining LP PUCCH after Step 2. This is to prevent system performance degradation that may occur when the LP PUCCH is lost.

>> If there is an LP PUSCH that overlaps with the LP PUCCH but is not yet (fully or partially) dropped, the UE may first multiplex the LP PUCCH with the LP PUSCH.

>> If the HP PUCCH overlaps with the LP PUCCH, the UE may multiplex the LP PUCCH with the HP PUCCH. However, since the conventional multiplexing scheme may cause additional collisions due to a change in the location of a PUCCH, the UE may perform multiplexing as follows to avoid the additional collisions.

>>> The UE may check the multiplexing timeline condition between the LP PUCCH and HP PUCCH. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.

>>> If the LP PUCCH satisfies the multiplexing timeline condition with the HP PUCCH, the UE may transmit the LP PUCCH and HP PUCCH by multiplexing them. The resource set of the HP PUCCH may be maintained as a selected resource set. That is, UCI included in the LP PUCCH may be added to bits of UCI included in the current HP PUCCH within a range that does not exceed maxPayloadSize configured for the resource set of the HP PUCCH so that the UCI included in the LP PUCCH may be included in the HP PUCCH. As a PUCCH resource identifier, the resource identifier of the HP PUCCH may be maintained.

>>> Otherwise, the UE may transmit the HP PUCCH without transmitting at least overlapping symbols of the LP PUCCH.

>> If the HP PUSCH overlaps with the LP PUCCH, the UE may multiplex the LP PUCCH and HP PUSCH. If the HP PUSCH, in which UCI of the HP PUCCH or DCI-triggered HP UCI is included, is transmitted, the UE may transmit the HP PUSCH without transmitting the LP PUCCH.

>>> The UE may check the multiplexing timeline condition between the LP PUCCH and HP PUSCH. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.

>>>> If the LP PUCCH satisfies the multiplexing timeline condition, the UE may transmit the LP PUSCH and HP PUSCH by multiplexing them. The multiplexing operation may be performed based on the details described in Section 9 of 3GPP TS 38.213 V16.2.0.

>>>> Otherwise, the UE may transmit the HP PUSCH without transmitting the at least overlapping symbols of the LP PUCCH.

If a plurality of LP UL channels collide with one HP UL channel, the UE may perform UL multiplexing of the LP UL channels sequentially from an LP UL channel preceding in chronological order, perform multiplexing of all LP UL channels at the same time, or perform multiplexing of only the most advanced LP UL channel in chronological order without transmitting other LP UL channels, which is to reduce the implementation complexity of the UE.

If a plurality of HP UL channels collide with one LP UL channel, the UE may perform multiplexing of all HP UL channels at the same time or transmit the plurality of HP UL channels without transmitting the LP UL channel, which is particularly useful when the timeline condition is not satisfied between one LP UL channel and some HP UL channels.

When the UE would not transmit at least overlapping symbols of an LP UL channel, whether the UE does not transmit only a minimum number of symbols or the entirety of the LP UL channel may be determined according to the capability of the UE or the implementation of the UE. Alternatively, the entire LP UL channel may not be transmitted at all times.

Alternatively, it may be determined according to the type of UL channel. For example, for a PUCCH, the UE may not transmit only a minimum number of symbols and may determine whether to transmit the remaining symbols according to the implementation of the UE. For a PUSCH, the UE may not transmit the entirety of the PUSCH at all times.

<Implementation B5> Treating LP HARQ-ACK (+SR) as Higher Priority

As described above, loss of an LP PUCCH may mean loss of a plurality of HARQ-ACK feedbacks, which may require multiple PDSCH retransmissions. To alleviate these problems, the UE may perform multiplexing for each priority by regarding LP PUCCH A carrying specific LP UCI (e.g., LP HARQ-ACK feedback and/or SR) as an HP UL channel under predetermined conditions. The BS may assume that the UE operates as described above. The predetermined conditions may include at least one of the following conditions.

- An HP PUCCH exists in a slot in which LP PUCCH A is transmitted.
- An HP PUSCH exists in a slot in which LP PUCCH A is transmitted.
- LP PUCCH A overlaps with any HP PUCCH, and the multiplexing timeline condition between the two channels are satisfied. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.
- LP PUCCH A overlaps with any HP PUSCH, and the multiplexing timeline condition between the two channels are satisfied. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.
- An LP PUSCH overlapping with LP PUCCH A overlaps with other HP UL channels.

When multiplexing is performed by regarding LP PUCCH A as an HP, the LP PUCCH A may not satisfy the multiplexing timeline condition with other HP UL channels depending on considered conditions. In this case, the LP PUCCH A may be excluded from HP multiplexing.

The UE may actually perform multiplexing at a different time for each priority. Accordingly, when LP UL multiplexing is performed, LP PUCCH A may be regarded as an LP. When HP UL multiplexing is performed, LP PUCCH A may be regarded as an HP if predetermined condition is satisfied. That is, LP PUCCH A may be involved in UL multiplexing for each priority, and LP PUCCH A may be transmitted repeatedly.

There may be inter-priority UL collisions between UL channels obtained as a result of multiplexing for each priority. In this case, the UE may transmit an HP UL channel by applying Implementation A3 or without transmitting at least overlapping symbols of an LP UL channel.

When the UE would not transmit at least overlapping symbols of an LP UL channel, whether the UE does not transmit only a minimum number of symbols or the entirety of the LP UL channel may be determined according to the capability of the UE or the implementation of the UE. Alternatively, the entire LP UL channel may not be transmitted at all times. Alternatively, it may be determined according to the type of UL channel. For example, for a PUCCH, the UE may not transmit only a minimum number of symbols and may determine whether to transmit the remaining symbols according to the implementation of the UE. For a PUSCH, the UE may not transmit the entirety of the PUSCH at all times.

<Implementation B6> Performing Per-Priority Multiplexing and Inter-Priority Multiplexing in Parallel and Selecting Best UL Channel The BS may assume that the UE performs UL multiplexing for each priority and also performs inter-priority UL multiplexing. The inter-priority UL multiplexing may be performed on the assumption that there are no priorities between UL channels. That is, in some implementations, the same priority may be assumed for all channels involved in the inter-priority multiplexing. In this case, the assumed priority may be the highest priority among the priorities of the channels involved in the UL multiplexing.

When result Y obtained by performing UL multiplexing for each priority has fewer UL channels dropped based on scheduling information than result X obtained by performing inter-priority UL multiplexing, or when result Y has more LP HARQ-ACK feedback to be transmitted than result X, the UE may select result Y obtained by performing the multiplexing for each priority.

<Implementation B7> Same Type of UCI for Different Subslots and Different Priorities According to Implementation B7, a plurality of UCIs may be included in one PUSCH or PUCCH, and the UCIs and the PUSCH or PUCCH may have different priorities. In particular, the same type of UCIs (HARQ-ACK, SR, or CSI) to be transmitted in different subslots and/or with different priorities may be multiplexed on one PUSCH or PUCCH. That is, the BS may assume that the same type of UCIs (HARQ-ACK, SR, or CSI) to be transmitted in different subslots and/or with different priorities are multiplexed on one PUSCH or PUCCH and then receive the corresponding PUSCH and/or PUCCH. In this case, the following may be considered.

> When the same type of UCIs with different priorities are included in one PUSCH or PUCCH, the following may be considered.

>> For an SR, an LP SR may not be included in the PUSCH or PUCCH.

>> For CSI, LP CSI may not be included in the PUSCH or PUCCH.

>> For a HARQ-ACK, an LP HARQ-ACK based on the Type-1 HARQ-ACK codebook may not be included in the PUSCH or PUCCH.

>> If LP UCI is included in the PUSCH or PUCCH, the LP HARQ-ACK or only the LP HARQ-ACK and LP SR may be included in the PUSCH or PUCCH. Alternatively, all or part of the LP UCI may be included in the PUSCH or PUCCH based on LP HARQ-ACK>LP SR>LP CSI or LP HARQ-ACK=LP SR>LP CSI. If the same type of UCIs with different priorities are included in an HP PUCCH, the resource set of the HP PUCCH may be maintained as a selected resource set. That is, the LP UCI may be added to bits of UCI included in the current HP PUCCH within a range that does not exceed maxPayloadSize configured for the resource set of the HP PUCCH so that the LP UCI may be included in the HP PUCCH.

> When the same type of UCIs with the same priority are included in one PUSCH or PUCCH, the following may be considered.

>> For an SR, only the last SR among positive SRs may be included in the PUSCH or PUCCH.

>> For CSI, only the last CSI may be included in the PUSCH or PUCCH.

>> For a HARQ-ACK, a plurality of HARQ-ACKs may be concatenated and transmitted.

In this case, the plurality of HARQ-ACKs may be concatenated in chronological order of subslots including HARQ-ACK PUCCHs.

<Implementation B8> Selective UCI Multiplexing for HP/LP PUCCH and/or PUSCH Based on UCI Type According to Implementation B8, a plurality of UCIs may be included in one PUSCH. In particular, UCI (e.g., LP UCI) with a specific priority may be included in a PUCCH or PUSCH (e.g., HP PUCCH or HP PUSCH) with a different priority. For example, the same type of UCIs (HARQ-ACK, SR, or CSI) to be transmitted in different subslots and/or with different priorities may be multiplexed on one PUSCH. To minimize the effects of UCIs on the reliability of the PUCCH or PUSCH, specific UCI may be selectively included in the PUCCH or PUSCH. In this case, the following may be considered.

Among LP UCIs, only an LP HARQ-ACK (and/or LP SR) may be selectively multiplexed with HP UCIs on the PUCCH or PUSCH. Alternatively, among the LP UCIs, only LP UCIs except for LP CSI may be selectively multiplexed with the HP UCIs on the PUCCH or PUSCH.

All or part of LP UCIs may be sequentially multiplexed with HP UCIs on the PUCCH or PUSCH according to the following LP UCI priorities: LP HARQ-ACK>LP SR>LP CSI or LP HARQ-ACK=LP SR>LP CSI.

In some implementations, the BS may assume that one or more LP UCIs included in an LP PUCCH and one or more HP UCIs included in an HP PUCCH are multiplexed (and transmitted) on the same one PUCCH according to the following options.

Option 1: Among the LP UCIs, only an LP HARQ-ACK (and/or LP SR) may be selectively multiplexed with the HP UCIs on one PUCCH. Alternatively, among the LP UCIs, only LP UCIs except for LP CSI may be selectively multiplexed with the HP UCIs on one PUCCH. Which LP UCI is to be multiplexed may be configured to the UE by a higher layer (e.g., RRC) configuration from the BS. In some implementations, the BS may assume that if a UCI payload obtained by combining the selected LP UCI and the HP UCIs does not exceed the maximum UCI payload transmitted over the PUCCH, the UE applies Option 1. In addition, the BS may assume that if the UCI payload exceeds the maximum UCI payload, the UE drops all the LP UCIs thereby not transmitting them. In some implementations, the BS may assume that if the multiplexing timeline condition is satisfied, the UE applies Option 1. In addition, the BS may assume that if the multiplexing timeline condition is not satisfied, the UE drops all the LP UCIs thereby not transmitting them. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.

Option 2: All or part of the LP UCIs may be sequentially multiplexed with the HP UCIs on one PUCCH according to the following LP UCI priorities: LP HARQ-ACK>LP SR>LP CSI or LP HARQ-ACK=LP SR>LP CSI. In some implementations, the BS may assume that the UE sequentially multiplexes the LP UCIs with the HP UCIs, starting from LP UCI having a higher priority until a UCI payload obtained by combining the HP UCIs and LP UCIs does not exceed the maximum UCI payload transmitted over the PUCCH. In some implementations, the BS may assume that if the multiplexing timeline condition is satisfied, the UE applies Option 2. In addition, the BS may assume that if the multiplexing timeline condition is not satisfied, the UE drops all the LP UCIs thereby not transmitting them. The multiplexing timeline condition may include the multiplexing timeline condition described in Sections 9.2.5 and 9 of 3GPP TS 38.213 V16.2.0 and the multiplexing timeline condition described in Implementation A1 and/or Implementation A2 of the present disclosure.

In some implementations, the BS may assume that one or more LP UCIs included in an LP PUCCH are multiplexed (and transmitted) on the same one PUSCH as follows.

Option 1: Among the LP UCIs, only an LP HARQ-ACK (and/or LP SR) may be selectively multiplexed with HP UCIs on one PUSCH. Alternatively, among the LP UCIs, only LP UCIs except for LP CSI may be selectively multiplexed with the HP UCIs on one PUSCH. In some implementations, the BS may assume that if REs required for a UCI payload obtained by combining the selected LP UCIs and the HP UCIs do not exceed the maximum REs for the UCI payload, which are determined with a UCI scaling factor of the PUSCH, the UE applies Option 1. In addition, the BS may assume that if the REs exceed the maximum REs, the UE drops all the LP UCIs thereby not transmitting them. In other words, the BS may assume that the UE multiplexes the HP UCIs first and then multiplexes the LP UCIs additionally within a range that does not exceed the maximum UCI payload size. In some implementations, the BS may assume that if the multiplexing timeline condition is satisfied, the UE applies Option 1. In addition, the BS may assume that if the multiplexing timeline condition is not satisfied, the UE drops all the LP UCIs thereby not transmitting them. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.

Option 2: All or part of the LP UCIs may be sequentially multiplexed with HP UCIs on one PUSCH according to the following LP UCI priorities: LP HARQ-ACK>LP SR>LP CSI or LP HARQ-ACK=LP SR>LP CSI. In some implementations, the BS may assume that the UE sequentially multiplexes the LP UCIs with the HP UCIs, starting from LP UCI having a higher priority until REs required for a UCI payload obtained by combining the selected LP UCIs and the HP UCIs do not exceed the maximum REs for the UCI payload, which are determined with a UCI scaling factor of the PUSCH. In other words, the BS may assume that the UE multiplexes the HP UCIs first and then multiplexes the LP UCIs additionally within a range that does not exceed the maximum UCI payload size. In some implementations, the BS may assume that if the multiplexing timeline condition is satisfied, the UE applies Option 2. In addition, the BS may assume that if the multiplexing timeline condition is not satisfied, the UE drops all the LP UCIs thereby not transmitting them. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.

<Implementation B9> Attempting Inter-Priority UL Multiplexing and Selecting UL Channel Based on Timeline Condition Violation The BS may assume that the UE performs inter-priority UL multiplexing first. In particular, the BS may assume that the UE performs the inter-priority UL multiplexing on the assumption that there are no priorities between UL channels. That is, the same priority may be assumed for all channels involved in the multiplexing. In this case, the assumed priority may be the highest priority among the priorities of the channels involved in the multiplexing.

When the channels involved in the inter-priority UL multiplexing do not satisfy the multiplexing timeline condition, the UE may check whether PUCCH(s) and/or PUSCH(s), which are indicated or configured and overlapping in time, satisfy the multiplexing timeline condition for each priority from the highest priority. The UE may perform intra-priority UL multiplexing and transmission only for the highest priority PUCCH(s) and/or PUSCH(s) that satisfy the multiplexing timeline condition. That is, when the inter-priority UL multiplexing violates the multiplexing timeline condition, the UE may perform only the highest priority UL transmission that satisfies the multiplexing timeline condition. The multiplexing timeline condition may include the timeline condition described in Section 9.2.5 of 3GPP TS 38.213 V16.2.0 and/or the multiplexing timeline condition described in Implementation A1 and/or Implementation A2 of the present disclosure.

Alternatively, if there are two or more priorities are indicated or configured for PUCCH(s) and/or PUSCH(s) to satisfy the multiplexing timeline condition, the UE may perform UL multiplexing between the priorities.

As another example, if the channels involved in the inter-priority UL multiplexing do not satisfy the multiplexing timeline condition, and if the highest priority PUCCH(s) and/or PUSCH(s) satisfy the multiplexing timeline condition, the UE may perform intra-priority UL multiplexing and transmission for the PUCCH(s) and/or PUSCH(s) with the corresponding priority.

The BS may receive the PUSCH or PUCCH expected to be transmitted by the UE according to the above-described operations.

When two priorities are configured, the BS may assume that the UE will operate as follows.

Option 1: When multiplexing timeline condition for each priority (i.e., intra-priority timeline condition) is checked first and then timeline condition between multiple priorities (i.e., inter-priority timeline condition) is checked, Case 1-1: Although the inter-priority timeline condition is checked because each of an LP PUSCH and/or LP PUCCH and an HP PUSCH and/or HP PUCCH satisfies the intra-priority timeline condition, if the above inter-priority timeline condition is not satisfied, LP UCI, the LP PUSCH, and the LP PUCCH may be dropped, and only HP UCI, the HP PUSCH, and/or the HP PUCCH may be transmitted.

Case 1-2: When only one of an LP PUSCH and/or LP PUCCH and an HP PUSCH and/or HP PUCCH (e.g., XP=LP or HP) satisfies the intra-priority timeline condition, only UCI and an PUSCH/PUCCH with corresponding XP may be transmitted, and UCI and an PUSCH/PUCCH with other priorities may be dropped. In this case, the operation of checking the inter-priority timeline condition may be skipped.

Option 2: When timeline condition between multiple priorities (i.e., inter-priority timeline condition) is checked first, Case 2-1: When the inter-priority timeline condition is not satisfied for all of an LP PUSCH and/or LP PUCCH and an HP PUSCH and/or HP PUCCH, the intra-priority timeline condition may be checked for each of the LP PUSCH and/or LP PUCCH and the HP PUSCH and/or HP PUCCH. If the HP is satisfied, the UE may drop LP UCI and the LP PUSCH/PUCCH and transmit HP UCI and the HP PUSCH/PUCCH.

Case 2-2: When the inter-priority timeline condition is not satisfied for all of an LP PUSCH and/or LP PUCCH and an HP PUSCH and/or HP PUCCH, the intra-priority timeline condition may be checked for each of the LP PUSCH and/or LP PUCCH and the HP PUSCH and/or HP PUCCH. If only the LP PUSCH/PUCCH is satisfied, the UE may drop HP UCI and the HP PUSCH/PUCCH and transmit LP UCI and the LP PUSCH/PUCCH. Alternatively, if the inter-priority timeline condition is not satisfied, the LP UCI and LP UL channel(s) may be dropped. Then, whether the HP satisfies the intra-priority timeline condition may be checked. When the intra-priority timeline condition are satisfied, the HP UCI and HP PUSCH/PUCCH may be transmitted. When the intra-priority timeline condition are not satisfied, the corresponding HP UCI and HP PUSCH/PUCCH may also be dropped.

Figure 20:
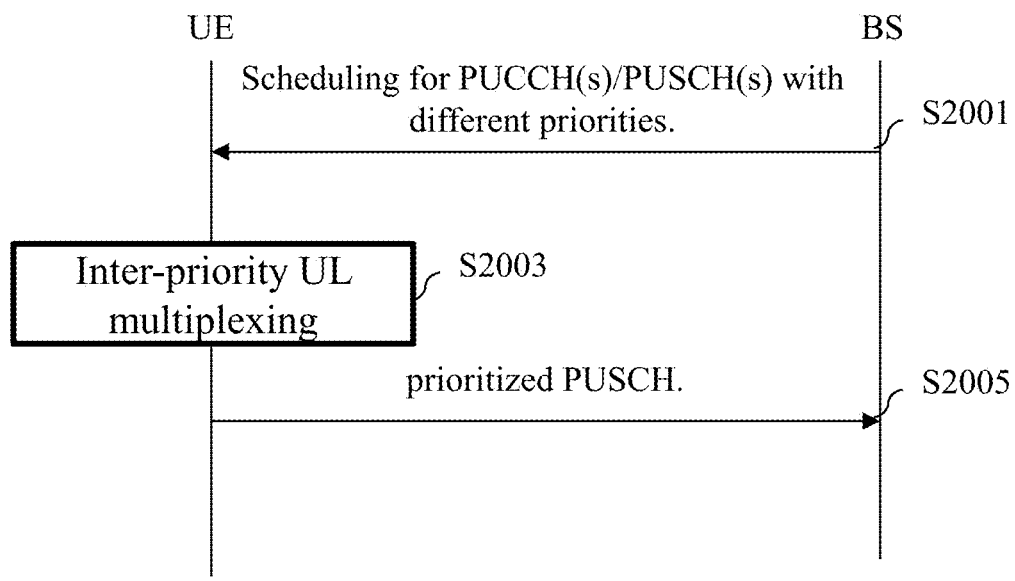
FIG. 20 illustrates a flow of signal transmission/reception between a UE and a BS according to some implementations of the present disclosure.

FIG. 20 illustrates a flow of signal transmission/reception between the UE and BS according to some implementations of the present disclosure.

The UE and BS may perform an RRC configuration required to transmit PUSCH(s) and/or PUCCH(s) with different priorities. The BS may schedule a plurality of PUSCH(s) and/or PUCCH(s) with different priorities to the UE (S2001). If the plurality of PUSCH(s) and/or PUCCH(s) scheduled by the BS to the UE overlap in time and have different priorities, the UE may perform inter-priority UL multiplexing according to some implementations of the present disclosure (S2003), and the BS may assume the inter-priority UL multiplexing. The UE may transmit a prioritized PUCCH or PUSCH based on the inter-priority UL multiplexing (S2005), and the BS may receive and/or decode the prioritized PUCCH or PUSCH based on the inter-priority UL multiplexing.

According to some implementations of the present disclosure, the UE may obtain a UL multiplexing result that may include LP UL transmission to the extent that the multiplexing result does not affect the latency or reliability of HP UL transmission, thereby improving the overall system efficiency. In addition, the UE may make the same assumption as that of the BS while selecting targets to be multiplexed in LP transmission, so that the operations between the UE and BS may be clarified.

In the prior art, it was not expected that the timeline condition is not satisfied between UL channels to be multiplexed. However, according to some implementations of the present disclosure, scheduling may be allowed such that the timeline condition is not satisfied between the UL channels, so that the scheduling flexibility of the BS may be improved. In addition, among UL transmissions having different priorities, the highest priority UL transmission that satisfies the timeline condition may be performed at least.

The UE may perform operations according to some implementations of the present disclosure in association with transmission of UL channel(s). The UE may include at least one transceiver; at least one processor; and at least one computer memory operably connectable to the at least one processor and storing instructions that, when executed, cause the at least one processor to perform operations according to some implementations of the present disclosure. A processing apparatus for the UE may include at least one processor; and at least one computer memory operably connectable to the at least one processor and storing instructions that, when executed, cause the at least one processor to perform operations according to some implementations of the present disclosure. A computer readable storage medium may store at least one computer program including instructions that, when executed by at least one processor, cause the at least one processor to perform operations according to some implementations of the present disclosure. A computer-readable (non-transitory) storage medium may store at least one computer program including instructions that, when executed by at least one processor, cause the at least one processor to perform the operations according to some implementations of the present disclosure. A computer program or computer program product may include instructions stored on at least one computer-readable (non-volatile) storage medium and, when executed, cause (at least one processor) to perform the operations according to some implementations of the present disclosure.

For the UE, processing device, computer-readable (non-volatile) storage medium, and/or computer program product, the operations may include: determining that UL channels with different priorities overlap in time; determining whether the UL channels with the different priorities satisfy a multiplexing timeline condition; based on that the UL channels with the different priorities do not satisfy the multiplexing timeline condition, determining a UL channel for multiplexing for UL channels having a highest priority among the different priorities and satisfying the multiplexing timeline condition; and performing transmission of the UL channel for multiplexing.

In some implementations of the present disclosure, the operations may further include, based on that the UL channels with the different priorities do not satisfy the multiplexing timeline condition, dropping UL channels other than the uplink channels having the highest priority satisfying the multiplexing timeline condition.

In some implementations of the present disclosure, the operations may include: based on that the UL channels with the different priorities satisfy the multiplexing timeline condition, determining a non-overlapping UL channel with a higher priority among UL channels with the higher priority and a non-overlapping UL channel with a lower priority among UL channels with the lower priority; and based on that the higher priority non-overlapping UL channel and the lower priority non-overlapping UL channel overlap in time, dropping the lower priority non-overlapping UL channel and performing transmission of the higher priority non-overlapping UL channel.

In some implementations of the present disclosure, determining whether the UL channels with the different priorities satisfy the multiplexing timeline condition may include, based on that for each priority, UL channels with a corresponding priority satisfy the multiplexing timeline condition, determining whether the multiplexing timeline condition is satisfied between the UL channels with the different priorities.

In some implementations of the present disclosure, determining whether the UL channels with the different priorities satisfy the multiplexing timeline condition may include: determining whether for each priority, UL channels with a corresponding priority satisfy the multiplexing timeline condition; and dropping UL channels with a priority that do not satisfy the multiplexing timeline condition and performing UL transmission based on UL channels with a priority that satisfy the multiplexing timeline condition.

In some implementations of the present disclosure, determining whether the UL channels with the different priorities satisfy the multiplexing timeline condition may include: determining whether the multiplexing timeline condition is satisfied between the UL channels with the different priorities; and based on that the multiplexing timeline condition is not satisfied between the UL channels with the different priorities, determining whether for each priority, UL channels with a corresponding priority satisfy the multiplexing timeline condition.

The BS may perform operations according to some implementations of the present disclosure in relation to HARQ-ACK reception. The BS may include: at least one transceiver; at least one processor; and at least one computer memory operably connected to the at least one processor and configured to store instructions that, when executed, cause the at least one processor to perform the operations according to some implementations of the present disclosure. A processing device for a BS may include: at least one processor; and at least one computer memory operably connected to the at least one processor and configured to store instructions that, when executed, cause the at least one processor to perform the operations according to some implementations of the present disclosure. A computer-readable (non-transitory) storage medium may store at least one computer program including instructions that, when executed by at least one processor, cause the at least one processor to perform the operations according to some implementations of the present disclosure. A computer program or computer program product may include instructions stored on at least one computer-readable (non-volatile) storage medium and, when executed, cause (at least one processor) to perform the operations according to some implementations of the present disclosure.

For the BS, processing device, computer-readable (non-volatile) storage medium, and/or computer program product, the operations may include: determining that UL channels with different priorities overlap in time; determining whether the UL channels with the different priorities satisfy a multiplexing timeline condition; based on that the UL channels with the different priorities do not satisfy the multiplexing timeline condition, determining an UL channel for multiplexing for UL channels having a highest priority among the different priorities and satisfying the multiplexing timeline condition; and performing reception of the UL channel for multiplexing.

In some implementations of the present disclosure, the operations may include, based on that the UL channels with the different priorities do not satisfy the multiplexing timeline condition, omitting reception or not decoding of UL channels other than the uplink channels having the highest priority satisfying the multiplexing timeline condition.

In some implementations of the present disclosure, the operations may include: based on that the UL channels with the different priorities satisfy the multiplexing timeline condition, determining a non-overlapping UL channel with a higher priority among UL channels with the higher priority and a non-overlapping UL channel with a lower priority among UL channels with the lower priority; and based on that the higher priority non-overlapping UL channel and the lower priority non-overlapping UL channel overlap in time, omitting reception or not decoding of the lower priority non-overlapping UL channel and performing reception of the higher priority non-overlapping UL channel.

In some implementations of the present disclosure, determining whether the UL channels with the different priorities satisfy the multiplexing timeline condition may include, based on that for each priority, UL channels with a corresponding priority satisfy the multiplexing timeline condition, determining whether the multiplexing timeline condition is satisfied between the UL channels with the different priorities.

In some implementations of the present disclosure, determining whether the UL channels with the different priorities satisfy the multiplexing timeline condition may include: determining whether for each priority, UL channels with a corresponding priority satisfy the multiplexing timeline condition; and omitting reception or not decoding of UL channels having a priority that do not satisfy the multiplexing timeline condition and performing UL reception based on UL channels having a priority that satisfy the multiplexing timeline condition.

In some implementations of the present disclosure, determining whether the UL channels with the different priorities satisfy the multiplexing timeline condition may include: determining whether the multiplexing timeline condition is satisfied between the UL channels with the different priorities; and based on that the multiplexing timeline condition is not satisfied between the UL channels with the different priorities, determining whether for each priority, UL channels with a corresponding priority satisfy the multiplexing timeline condition.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

What is claimed is:

1. A method of transmitting control information by a user equipment (UE) in a wireless communication system, the method comprising:
   determining that a transmission of a first physical uplink control channel (PUCCH) of smaller priority, which carries i) first hybrid automatic repeat request acknowledgment (HARQ-ACK) information and ii) channel state information (CSI) and scheduling request (SR), overlaps in time with a transmission of a second uplink channel of larger priority;
   based on a timeline condition defined for multiplexing uplink control information (UCI) being satisfied and based on the UE supporting multiplexing information of different priorities in an uplink channel transmission,
      i) multiplexing the first HARQ-ACK information of the first PUCCH onto a physical uplink channel of larger priority, and
      ii) dropping the CSI and the SR carried in the first PUCCH of smaller priority; and
   performing a transmission of the physical uplink channel of larger priority.

2. The method of claim 1, wherein multiplexing the first HARQ-ACK information of the first PUCCH onto the physical uplink channel of larger priority comprises
   based on the second uplink channel carrying second HARQ-ACK information of larger priority, multiplexing the first HARQ-ACK information and the second HARQ-ACK information in the physical uplink channel of larger priority.

3. The method of claim 1, wherein the physical uplink channel of larger priority is a PUCCH.

4. The method of claim 1, wherein the physical uplink channel of larger priority is a PUSCH.

5. The method of claim 1, further comprising:
   determining the first PUCCH of smaller priority, based on multiple uplink transmissions of smaller priority that overlap in time.

6. The method of claim 1, further comprising:
   determining the second uplink channel of larger priority, based on multiple uplink transmissions of larger priority that overlap in time.

7. A user equipment (UE) configured to transmit control information in a wireless communication system, the UE comprising:
   at least one transceiver;
   at least one processor; and
   at least one computer memory operably connected to the at least one processor and configured to store instructions that, when executed, cause the at least one processor to perform operations comprising:
   determining that a transmission of a first physical uplink control channel (PUCCH) of smaller priority, which carries i) first hybrid automatic repeat request acknowledgment (HARQ-ACK) information and ii) channel state information (CSI) and scheduling request (SR), overlaps in time with a transmission of a second uplink channel of larger priority;
   based on a timeline condition defined for multiplexing uplink control information (UCI) being satisfied and based on the UE supporting multiplexing information of different priorities in an uplink channel transmission,
      i) multiplexing the first HARQ-ACK information of the first PUCCH onto a physical uplink channel of larger priority, and
      ii) dropping the CSI and the SR carried in the first PUCCH of smaller priority; and
   performing a transmission of the physical uplink channel of larger priority.

8. The UE of claim 7, wherein multiplexing the first HARQ-ACK information of the first PUCCH onto the physical uplink channel of larger priority comprises
   based on the second uplink channel carrying second HARQ-ACK information of larger priority, multiplexing the first HARQ-ACK information and the second HARQ-ACK information in the physical uplink channel of larger priority.

9. The UE of claim 7, wherein the physical uplink channel of larger priority is a PUCCH.

10. The UE of claim 7, wherein the physical uplink channel of larger priority is a PUSCH.

11. The UE of claim 7, wherein the operations further comprise:
   determining the first PUCCH of smaller priority, based on multiple uplink transmissions of smaller priority that overlap in time.

12. The UE of claim 7, wherein the operations further comprise:

determining the second uplink channel of larger priority, based on multiple uplink transmissions of larger priority that overlap in time.

13. A base station (BS) configured to receive control information from a user equipment (UE) in a wireless communication system, the BS comprising:

at least one transceiver;

at least one processor; and at least one computer memory operably connected to the at least one processor and configured to store instructions that, when executed, cause the at least one processor to perform operations comprising:

determining that a reception of a first physical uplink control channel (PUCCH) of smaller priority, which carries i) first hybrid automatic repeat request acknowledgment (HARQ-ACK) information and ii) channel state information (CSI) and scheduling request (SR), overlaps in time with a reception of a second uplink channel of larger priority;

based on a timeline condition defined for multiplexing uplink control information (UCI) being satisfied and based on the UE supporting multiplexing information of different priorities in an uplink channel, receiving the first HARQ-ACK information without the CSI and the SR in a physical uplink channel of larger priority, and dropping a reception of the CSI and the SR.

14. The BS of claim 13, wherein receiving the first HARQ-ACK information without the CSI and the SR in the physical uplink channel of larger priority comprises based on the second uplink channel carrying second HARQ-ACK information of larger priority, receiving the first HARQ-ACK information and the second HARQ-ACK information in the physical uplink channel of larger priority.

15. The BS of claim 13, wherein the physical uplink channel of larger priority is a PUCCH.

16. The BS of claim 13, wherein the physical uplink channel of larger priority is a PUSCH.

17. The BS of claim 13, wherein the operations further comprise:

determining the first PUCCH of smaller priority, based on multiple uplink receptions of smaller priority that overlap in time.

18. The BS of claim 13, wherein the operations further comprise:

determining the second uplink channel of larger priority, based on multiple uplink receptions of larger priority that overlap in time.

* * * * *